(12) United States Patent
Hibara et al.

(10) Patent No.: US 8,717,952 B2
(45) Date of Patent: May 6, 2014

(54) WIRELESS TERMINAL POSITIONING SYSTEM, METHOD OF POSITIONING WIRELESS TERMINAL, ENVIRONMENT MEASUREMENT SYSTEM, FACILITY MANAGEMENT SYSTEM, METHOD OF MEASURING ENVIRONMENT, AND METHOD OF DECIDING DESTINATION OF WIRELESS MOBILE TERMINAL

(75) Inventors: Naoyuki Hibara, Chiyoda-ku (JP); Yoshiaki Koizumi, Chiyoda-ku (JP); Masanori Nakata, Chiyoda-ku (JP); Noriyuki Kushiro, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 171 days.

(21) Appl. No.: 13/058,546

(22) PCT Filed: Mar. 13, 2009

(86) PCT No.: PCT/JP2009/054900
§ 371 (c)(1),
(2), (4) Date: Feb. 11, 2011

(87) PCT Pub. No.: WO2010/021170
PCT Pub. Date: Feb. 25, 2010

(65) Prior Publication Data
US 2011/0141909 A1 Jun. 16, 2011

(30) Foreign Application Priority Data
Aug. 20, 2008 (JP) .................................. 2008-211454

(51) Int. Cl.
*H04B 7/00* (2006.01)
(52) U.S. Cl.
USPC ....................................................... 370/310
(58) Field of Classification Search
USPC ............... 370/310–350; 455/421, 456.1–461; 350/310–350
See application file for complete search history.

(56) References Cited

U.S. PATENT DOCUMENTS
7,400,264 B2 * 7/2008 Boaz ........................ 340/870.02
(Continued)

FOREIGN PATENT DOCUMENTS
JP 2003-130695 A 5/2003
(Continued)

OTHER PUBLICATIONS

International Search Report (PCT/ISA/210) issued on Apr. 7, 2009, by Japanese Patent Office as the International Searching Authority for International Application No. PCT/JP2009/054900.
(Continued)

*Primary Examiner* — Andrew Chriss
*Assistant Examiner* — Kenan Cehic
(74) *Attorney, Agent, or Firm* — Buchanan Ingersoll & Rooney PC

(57) ABSTRACT

To obtain a method of positioning a wireless terminal capable of obtaining the position of each communication terminal by measuring distances with installed communication terminals each other without fixedly installing a base station.
A positioning management terminal 100 includes a positioning object decision section 130 that selects a terminal to be positioned, which is a positioning object, and a positioning standard terminal, whose position is known, among the wireless terminals 200; a positioning management section 120 that requires distance information between the terminal to be positioned and the positioning standard terminal; and a position calculation section 140 that calculates the position of the terminal to be positioned. The positioning management section 120 requires distance information from the positioning standard terminal selected by the positioning object decision section 130 to the terminal to be positioned selected by the positioning object decision section 130. The position calculation section 140 calculates the position of the terminal to be positioned using the distance information and position information of the positioning standard terminal.

13 Claims, 22 Drawing Sheets

(56) References Cited

U.S. PATENT DOCUMENTS

| | | | |
|---|---|---|---|
| 8,190,312 B2* | 5/2012 | Nandedkar et al. | 701/19 |
| 2003/0221821 A1 | 12/2003 | Patel et al. | |
| 2003/0236866 A1 | 12/2003 | Light | |
| 2004/0008113 A1* | 1/2004 | Pradhan et al. | 340/539.26 |
| 2005/0135319 A1 | 6/2005 | Shi et al. | |
| 2005/0141302 A1 | 6/2005 | Maeda et al. | |
| 2005/0271057 A1 | 12/2005 | Kim et al. | |
| 2005/0288888 A1 | 12/2005 | Ye et al. | |
| 2007/0217379 A1 | 9/2007 | Fujiwara et al. | |
| 2007/0276540 A1 | 11/2007 | Okuda et al. | |
| 2007/0296633 A1 | 12/2007 | Yanagihara | |
| 2008/0258880 A1* | 10/2008 | Smith et al. | 340/286.02 |
| 2011/0051658 A1* | 3/2011 | Jin et al. | 370/328 |

FOREIGN PATENT DOCUMENTS

| | | | |
|---|---|---|---|
| JP | 2003-329757 A | 11/2003 | |
| JP | 2004-15147 A | 1/2004 | |
| JP | 2005-348418 A | 12/2005 | |
| JP | 2006-105662 A | 4/2006 | |
| JP | 3860935 B2 | 12/2006 | |
| JP | 2007-248362 A | 9/2007 | |
| JP | 2007-306540 A | 11/2007 | |
| JP | 2008-17027 A | 1/2008 | |
| WO | WO 2004/064332 A1 | 7/2004 | |
| WO | WO 2011/009580 A1 | 1/2011 | |

OTHER PUBLICATIONS

Official Communication together with a partial European Search Report dated Dec. 7, 2011, issued in the corresponding European Patent Application No. 11001834.8. (6 pages).

Office Action from Chinese Patent Office dated Jan. 5, 2013, issued in corresponding Chinese Patent Application No. 200980132237.2, with English translation thereof.

Extended Search Report issued Mar. 20, 2012, in the corresponding European Patent Application No. 11001834.8. (11 pages).

Shang et al., "Localization from Mere Connectivity," Proceeding of the 4th ACM International Symposium on Mobile AD HOC Networking & Computing, MOBIHOC '03, Jan. 1, 2003, pp. 201-212, New York, NY, USA, XP55006982.

Extended Search Report from European Patent Office issued in corresponding European Patent Application No. 09808106.0 dated Sep. 23, 2011.

Office Action dated Jul. 5, 2012, in the corresponding European Patent Application No. 09 808 106.0. (4 pages).

The partial European Search Report dated Jun. 27, 2012, in the corresponding European Patent Application No. 12002326.2. (7 pages).

Brignone et al., "SmartLOCUS: An autonomous, self-assembling sensor network for indoor asset and systems management", Retrieved from the Internet: URL:http://www.hpl.hp.com/techreports/2003/HPL-2003-41.pdf., (Jan. 1, 2005), pp. 1-14.

Extended Search Report from European Patent Office dated Oct. 10, 2012, issued in corresponding European Patent Application No. 12002326.2.

Office Action from European Patent Office dated Dec. 6, 2012, issued in corresponding European Patent Application No. 11001834.8.

Office Action (Notification of the Second Office Action) issued on Aug. 21, 2013 by the Chinese Patent Office in corresponding Chinese Patent Application No. 200980132237.2, and an English Translation of the Office Action. (15 pages).

Office Action from the Japan Patent Office dated May 7, 2013, issued in corresponding Japanese Patent Application No. 2010-525621, with English translation thereof. (7 pages).

Office Action from European Patent Office dated Jun. 5, 2013, issued in corresponding European Patent Application No. 11001834.8. (7 pages).

Jan. 6, 2014 Chinese Office Action issued in Chinese Application No. 200980132237.2.

* cited by examiner

FIG. 6

| RANGE-FINDING DATA REQUEST IDENTIFIER | TERMINAL ADDRESS TO BE POSITIONED | TRANSMISSION SOURCE TERMINAL ADDRESS | NUMBER OF RANGE-FINDING TERMINAL | ADDRESS 1 | RANGE-FINDING INFORMATION 1 | ... | ADDRESS n | RANGE-FINDING INFORMATION n |
|---|---|---|---|---|---|---|---|---|
| 601 | 602 | 603 | 604 | | 605 | 606 | | |

600

WIRELESS TERMINAL POSITIONING SYSTEM, METHOD OF POSITIONING WIRELESS TERMINAL, ENVIRONMENT MEASUREMENT SYSTEM, FACILITY MANAGEMENT SYSTEM, METHOD OF MEASURING ENVIRONMENT, AND METHOD OF DECIDING DESTINATION OF WIRELESS MOBILE TERMINAL

TECHNICAL FIELD

The present invention relates to a wireless terminal positioning system that calculates the position of a wireless terminal and a method of the calculation, and to a technique that measures environmental conditions.

BACKGROUND ART

In a small-scale wireless network system supposed to be used mainly in a building facility and in a home such as a sensor network system, a technique has been developed that measures the position of a wireless communication terminal with high precision.

Since a GPS (Global Positioning System) signal cannot be received in the building facility and in the home, a system is known that measures a distance and a distance difference among a plurality of terminals to estimate the position using a time of arrival (TOA) of radio waves from a base station whose position is known, a time difference of arrival (TDOA) of radio waves, and a radio wave receiving intensity.

An assumption is made that coordinates of a base station are known in advance in the above. In order to save time and effort to set coordinates of the base station, a technique is proposed such that "at least (N+1) base stations (N=1 to 3) and positioning servers are provided. The distances among at least (N+1) base stations are calculated. Relative coordinates of each base station are obtained. The obtained relative coordinates are evaluated. A switching to the terminal positioning processing for obtaining the position of the terminal is judged. The position of the terminal is obtained using a propagation time of the wireless signal that is transmitted and received between the terminal and the base station and relative coordinates among the obtained base stations."

On the other hand, in a wireless communication system in which a number of terminals are installed for buildings and homes in general, since an output is suppressed so as to be able to be driven by batteries, causing a limit in a communication range to be from approximately several meters to several tens of meters.

As a result, like ZigBee (trademark), for example, a multi-hop network technique is known that enables communications in a wider area in which an intermediate communication terminal relays data for terminals to which no radio waves can reach directly.

In recent years, in buildings and factories, sensors are installed at various locations and an environment measurement system is employed that measures environmental conditions such as temperature, humidity, and luminance in order to properly control air conditioning and lighting apparatuses. For example, in an air conditioning system, an air conditioning apparatus is controlled such that the measurement value of a temperature sensor installed at the air supply opening and the remote controller of the indoor unit of the air conditioning apparatus becomes a set temperature.

Further, in order to carefully control the apparatus according to the request by residents and the temperature distribution of the space, and to precisely evaluate energy performance of the building, environmental conditions need to be measured at more measurement points.

In order to measure environmental conditions at a number of measurement points, in general, a number of sensors need to be installed at a number of places by increasing the number of sensors to be measured. Therefore, increase in cost and complicated management become challenges.

In relation to the above environment measurement, as a technique intended "to improve precision and accuracy of plant diagnosis and reduce variations in inspection by making the sensor to be self-advancing to obtain a number of process values at many points in order to measure the facility in the plant and process values of the area", such a technique is proposed that "a sensor detects the facility constituting a plant or a process value of a predetermined area. The sensor is provided with drive means that moves to a desired position in the facility or a predetermined area to detect process values." (Patent Literature 2)

Patent Literature 1 Japanese Unexamined Patent Application Publication No. 2007-248362
Patent Literature 2 Japanese Unexamined Patent Application Publication No. 2003-130695

SUMMARY OF INVENTION

Technical Problem

According to a conventional method, in a system where a number of communication terminals are installed having low output over a wide area and communication is performed by relaying in the middle to terminals incapable of direct communication, a number of base stations to be a standard for positioning need to be installed so as to cover the area where the network system is installed.

In a method that automatically obtains a relative position between base stations like the above Patent Literature 1, all the base stations need to communicate each other, therefore, it is difficult to decide the relative position of the base station in the area beyond a communication range of a base station.

The self-advancing sensor according to the above Patent Literature 2 moves along piping and runs on a rail laid in advance. Accordingly, a rail guide and the like to be a reference when controlling a moving position of the self-advancing sensor has to be installed in advance, resulting costly.

The present invention is done to solve the above problems and its object is to obtain a method for positioning a wireless terminal capable of obtaining the position of each communication terminal by measuring a distance among installed communication terminals with no base station being installed fixedly.

Another object is to provide a method for measuring environmental conditions at a number of measurement points with less cost by a few sensor terminals.

Solution to Problem

A wireless terminal positioning system according to the present invention has a positioning management terminal that manages one or a plurality of wireless terminals and the positioning of the wireless terminals. The positioning management terminal includes: a positioning object decision section that selects a terminal to be positioned, which is a positioning object, and a positioning standard terminal, whose position is known, among the above wireless terminals; a positioning management section that requires distance information between the terminal to be positioned and the positioning standard terminal; and a position calculation section that calculates the position of the terminal to be positioned. The wireless terminal includes a distance measurement section that measures the distance from the adjacent terminal at which wireless signals of the wireless terminal arrives, and a communication section that transmits measurement results of the distance measurement section to the positioning management terminal. The positioning management terminal requires distance information from the positioning standard terminal selected by the positioning object decision section to the terminal to be positioned selected by the positioning object decision section. The position calculation section calculates the position of the terminal to be positioned using the distance information and position information of the positioning standard terminal.

An environment measurement system according to the present invention measures environmental conditions of a measurement object space. There are provided: a fixed sensor terminal fixedly installed in the measurement object space; a mobile sensor terminal that moves in the measurement object space; and positioning means that measures the position of the mobile sensor terminal. The fixed sensor terminal measures environmental conditions surrounding the installation place of the self terminal. The fixed sensor terminal and the mobile sensor terminal transmit or receive signals for positioning the mobile sensor terminal. The positioning means positions the mobile sensor terminal using the signals. The mobile sensor terminal measures environmental conditions around the self terminal while grasping the position of the self terminal in the measurement object space using the positioning results.

Advantageous Effects of Invention

In the wireless terminal positioning system according to the present invention, a terminal to be positioning and a positioning standard terminal are selected in order and distance information is obtained. Based on the position information, the position of the wireless terminal is calculated.

Accordingly, there is no need to install a base station fixedly. Wireless terminals measure distance each other in order and distance information is collected, thus enabling to obtain positions of wireless terminals installed over a wide range.

In the environment measurement system according to the present invention, the mobile sensor terminal measures environmental conditions while grasping the position of the self terminal to move in the measurement object space. Thereby, it becomes possible to measure environmental conditions of a number of measurement points only by a few mobile sensor terminals while moving.

Since a fixed sensor terminal is available as a standard of position detection, there is no need to lay a guide such as a rail for controlling movement position of the mobile sensor terminal, being advantageous over cost.

BRIEF DESCRIPTION OF DRAWINGS

FIG. 6 is a configuration diagram of a range-finding data response packet 600.

Figure 1:
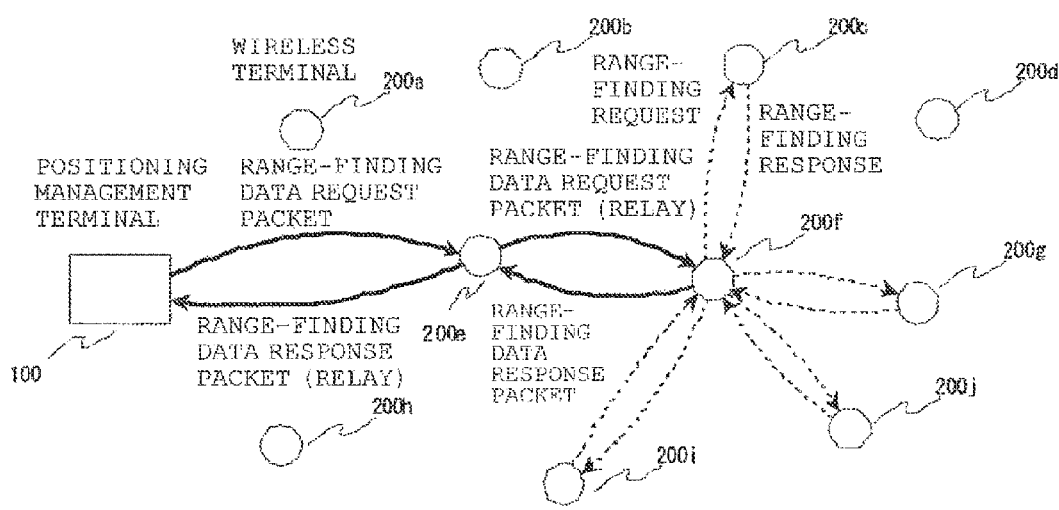
FIG. 1 is a configuration diagram of a wireless positioning system of Embodiment 1.

REFERENCE SIGNS LIST 100 positioning management terminal
110 communication section
120 positioning procedure management section 130 positioning object decision section
140 position calculation section
150 terminal information storage section
200a-200j wireless terminal
210 communication section
220 distance measurement section
230 range-finding data processing section
240 adjacent terminal search section
250 adjacent terminal data processing section
300 mobile wireless terminal
500 range-finding data request packet
501 range-finding data request identifier
502 transmission source terminal address
503 terminal address to be positioned
504 number of range-finding terminal
505 range-finding object terminal address
600 range-finding data response packet
601 range-finding data response identifier
602 terminal address to be positioned
603 transmission destination terminal address
604 number of range-finding terminal
605 range-finding object address
606 range-finding information
700 wireless terminal list
701 terminal address
702 position information
703 adjacent terminal list
704 terminal address
705 distance information
1300 adjacent terminal data request packet
1301 adjacent terminal data request identifier
1302 transmission source terminal address
1303 search source terminal address
1400 adjacent terminal data response packet
1401 adjacent terminal data response identifier
1402 search source terminal address
1403 transmission destination terminal address
1404 number of adjacent terminal
1405 adjacent terminal address
2100 fixed sensor terminal
2100a-2100c fixed sensor terminal
2110 terminal control section
2111 wireless communication section
2112 environment measurement section
2200 mobile sensor terminal
2210 terminal control section
2211 wireless communication section
2212 environment measurement section
2213 wireless positioning section
2214 self position control section
2215 drive section
2701 window
2702 gateway
2901 position detection standard terminal
2902 position detection object terminal
3101 typical point
3201 mobile cart
3202 control module
3203 support table
3204 sensor module
3300 facility management apparatus
3301 facility management section
3302 wireless communication section

DESCRIPTION OF EMBODIMENTS

Embodiment 1

FIG. 1 is a configuration diagram of a wireless positioning system of Embodiment 1.

The wireless positioning system of Embodiment 1 includes one or a plurality of positioning management terminals 100 and wireless terminals 200a to 200j.

The positioning management terminal 100 manages a positioning process that measures positions of wireless terminals 200a to 200j. Specific procedures will be described using FIGS. 8 to 10 to be mentioned later.

The wireless terminals 200a to 200j are a communication terminal having a wireless communication function.

In the following description, alphabetical subscripts will be added when differentiating the wireless terminals 200a to 200j. In a generic explanation, they are called a wireless terminal 200. Each function section provided with the wireless terminal 200 is the same.

Figure 2:
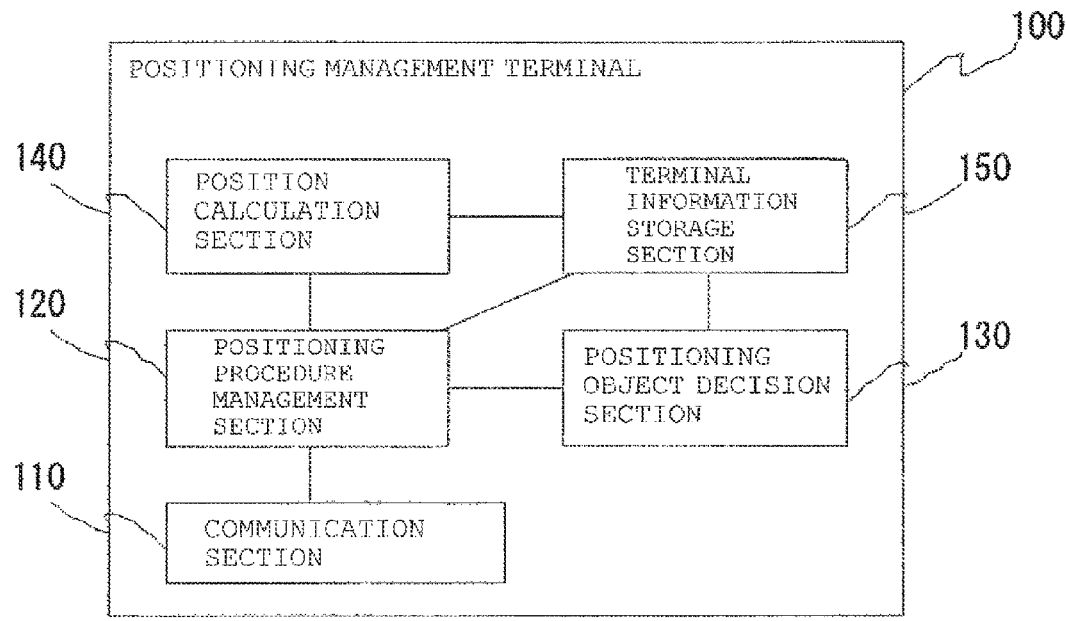
FIG. 2 is a function block diagram of a positioning management terminal 100 of Embodiment 1.

FIG. 2 is a function block diagram of a positioning management terminal 100 of Embodiment 1.

A positioning management terminal 100 includes a communication section 110, a positioning procedure management section 120, a positioning object decision section 130, a position calculation section 140, and a terminal information storage section 150.

The communication section 110 performs wireless communication with the wireless terminal 200.

The terminal information storage section 150 holds a wireless terminal list 700 in the wireless positioning system. The wireless terminal list 700 will be described again in FIG. 7 to be mentioned later.

The position calculation section 140 calculates a position in the Nth-dimension space of the wireless terminal 200, that is Nth-dimension coordinates, from distances between at least (N+1) wireless terminals 200 (N is a dimension of the position to be calculated, N=1 to 3) whose positions are known and the wireless terminal 200 to be the object for deciding the position.

In the following explanations, the wireless terminal 200 whose position is known is referred to as a "positioning standard terminal" and the wireless terminal 200 to be an object for deciding the position is referred to as a "terminal to be positioned".

A positioning procedure management section 120 and a positioning object decision section 130 specify which wireless terminals 200 are to be the positioning standard terminal and the terminal to be positioned. Details will be described later.

The positioning procedure management section 120 manages communication with each wireless terminal 200 for positioning, position calculation of the wireless terminal 200 by a position calculation section 140, and procedure like selection of the positioning standard terminal and the terminal to be positioned by the positioning object decision section 130 to manage positioning operation in the present wireless positioning system.

The positioning object decision section 130 decides the wireless terminal 200 to be an object for next positioning and the wireless terminal 200 (positioning standard terminal) to be a standard for positioning when the wireless terminal 200 is made to be the terminal to be positioned.

As for a decision technique to decide which wireless terminal be the terminal to be positioned and the positioning standard terminal, descriptions will be given later.

Figure 3:
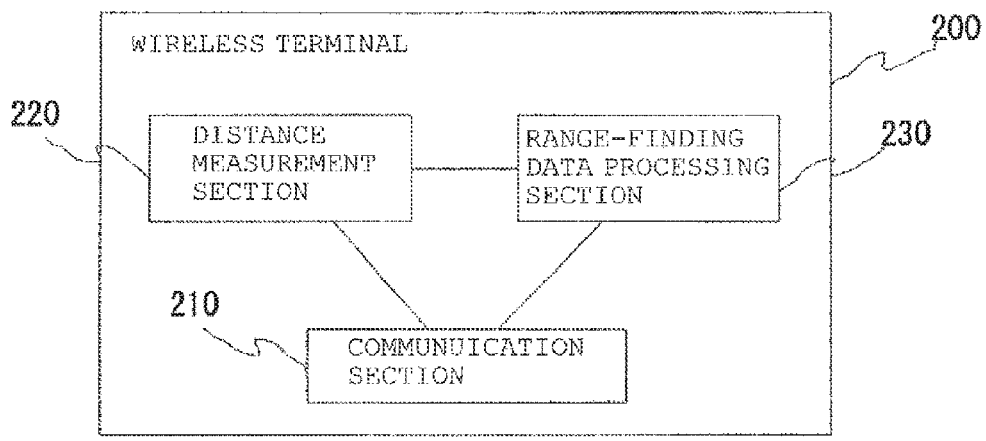
FIG. 3 is a function block diagram of a wireless terminal 200 of Embodiment 1.

FIG. 3 is a function block diagram of a wireless terminal 200 of Embodiment 1.

The wireless terminal 200 includes a communication section 210, a distance measurement section 220, and a range-finding data processing section 230.

The communication section 210 performs wireless communication with the positioning management terminal 100 and other wireless terminals 200.

The distance measurement section 220 measures the distance between two wireless terminals 200 using wireless communication. Procedure for distance measurement between wireless terminals 200 will be explained in FIG. 4 to be mentioned later.

The range-finding data processing section 230 transmits and receives range-finding data request packet and range-finding response packet between the wireless terminal 200 and the positioning management terminal 100 via the communication section 210. Further, the section 230 transmits and receives range-finding data request packet and range-finding response packet in FIG. 4 to be mentioned later.

The range-finding data processing section 230 can deliver range-finding data request packet and range-finding response packet via the communication section 210 to the wireless terminal 200 and the positioning management terminal 100 to which no wireless signal is directly delivered by a multi-hop communication.

The communication section 110 of the positioning management terminal 100 and the communication section 210 of the wireless terminal 200 perform packet communication with the positioning management terminal 100 or the wireless terminal 200 to which wireless signals are directly delivered.

The communication section 210 makes it possible to transfer packets to the positioning management terminal 100 and the wireless terminal 200 to which no wireless signal is directly delivered by relaying packets to other wireless terminals 200 to transmit them.

In order to relay packets to the positioning management terminal 100 and the wireless terminal 200 to which no wireless signal is directly delivered, the communication section 110 and the communication section 210 utilize a multi-hop network protocol such as ZigBee.

Figure 4:
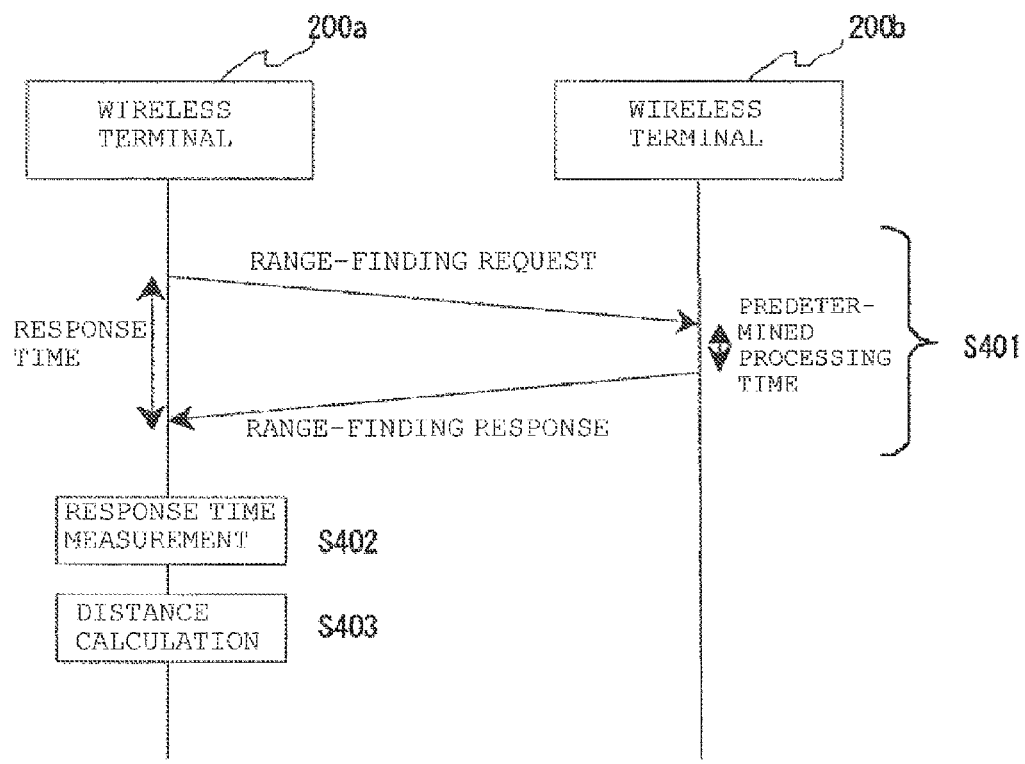
FIG. 4 is an illustration diagram of procedure in which a distance measurement section 220 of the wireless terminal 200 performs distance measurement.

FIG. 4 is an illustration diagram of procedure in which the distance measurement section 220 of the wireless terminal 200 performs distance measurement. Here, an example is given in which the wireless terminal 200a measures the distance from the wireless terminal 200b. Descriptions will be given to each step of FIG. 4 as follows.

(S401)
The distance measurement section 220a of the wireless terminal 200a transmits a range-finding request packet to the wireless terminal 200b via the communication section 210.

On receiving the range-finding request packet, the distance measurement section 220b of the wireless terminal 200b transmits a range-finding response packet to the wireless terminal 200a after a predetermined processing time being elapsed.

On receiving the range-finding response packet, the distance measurement section 220a of the wireless terminal 200a measures a response time from the transmission of the range-finding request packet to the receipt of the range-finding response packet.

Time measurement from the transmission of the range-finding request packet to the receipt of the range-finding response packet is performed such that a counter timer is started when transmitting the range-finding request packet, the counter is stopped when receiving the range-finding response packet, then the time value of the counter is read.

(S402)
The distance measurement section 220a of the wireless terminal 200a subtracts a predetermined processing time of the wireless terminal 200b from the receipt of the range-finding request packet to the transmission of the range-finding response packet based on the response time in step S401 to calculate a radio wave propagation time between the wireless terminals 200a and 200b.

(S403)
The distance measurement section 220a of the wireless terminal 200a obtains the distance between the wireless terminals 200a and 200b by multiplying the radio wave propagation time by the speed of light.

When transmitting and receiving range-finding request and range-finding response, the communication section 210 can measure more accurate distance because using a ultra wide band impulse wireless signal that transmits an impulse signal, response time can be measured accurately.

Figure 5:
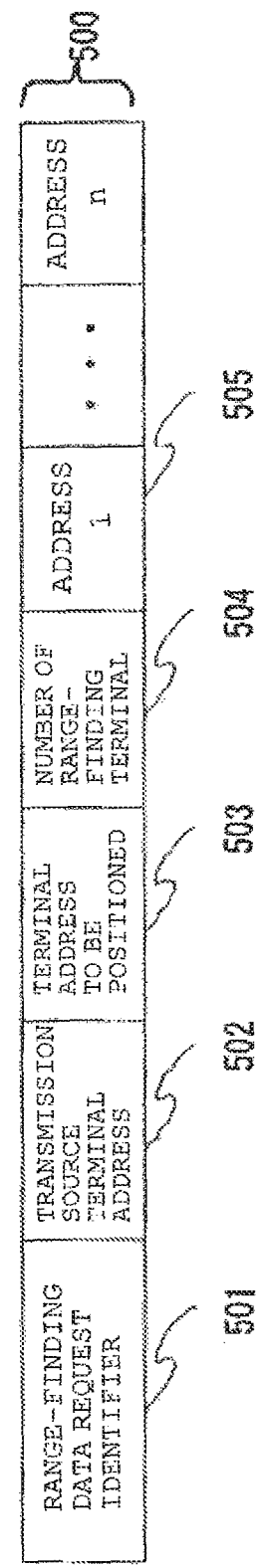
FIG. 5 is a configuration diagram of a range-finding data request packet 500.

FIG. 5 is a configuration diagram of the range-finding data request packet 500. The range-finding data request packet 500 is the packet that is intended to request transmission of range-finding results of the wireless terminal 200 that received the packet 500.

The range-finding data request packet 500 includes a range-finding data request identifier 501, a transmission source terminal address 502, a terminal address 503 to be positioned, a number 504 of range-finding terminal, and a range-finding object terminal address 505.

In the range-finding data request identifier 501, an identifier is stored that shows that the relevant packet is the range-finding data request packet.

In the transmission source terminal address 502, the transmission source terminal address of the relevant packet is stored.

In the terminal address 503 to be positioned, the terminal address to be positioned is stored.

In the number 504 of range-finding terminal, the number of terminals of range-finding object is stored.

In the range-finding object terminal address 505, the range-finding object terminal address is stored for as many as the number shown by the number 504 of range-finding terminal.

FIG. 6 is a configuration diagram of the range-finding data response packet 600. The range-finding data response packet 600 is the response packet corresponding to the range-finding data request packet 500.

The range-finding data response packet 600 includes a range-finding data response identifier 601, a terminal address to be positioned 602, a transmission destination terminal address 603, a number 604 of range-finding terminal, a range-finding object terminal address 605, and range-finding information 606.

In the range-finding data response identifier 601, an identifier is stored that shows that the relevant packet is the range-finding data response packet.

In the terminal address to be positioned 602, the terminal address to be positioned is stored.

In the transmission destination terminal address 603, the transmission destination terminal address of the relevant packet is stored.

In the number 604 of range-finding terminal, the number of terminals of range-finding object is stored.

In the range-finding object terminal address 605, the range-finding object terminal address is stored for as many as the number shown by the number 604 of range-finding terminal.

In the range-finding information 606, range-finding results are stored for each range-finding object terminal.

When the wireless terminal 200 receives the range-finding request packet, the distance measurement section 220 performs range-finding between the wireless terminals 200 designated by the range-finding object terminal address 505 of the range-finding request packet.

Next, the range-finding data processing section 230 generates the range-finding response packet to transmit it to the transmission source of the range-finding request packet based on the range-finding results performed by the distance measurement section 220.

Figure 7:
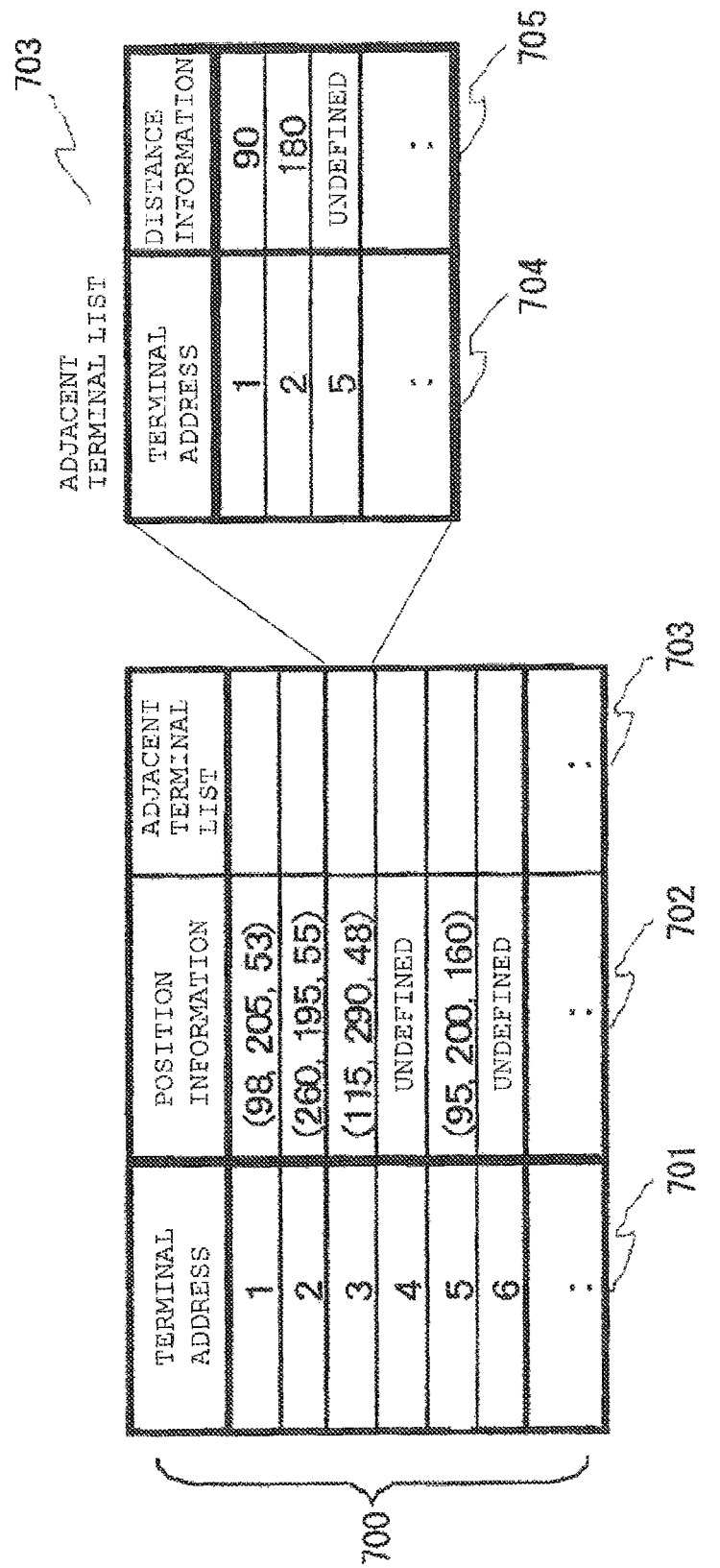
FIG. 7 is a configuration diagram of a wireless terminal list 700 that a terminal information storage section 150 stores.

FIG. 7 is a configuration diagram of a wireless terminal list 700 that a terminal information storage section 150 stores.

The wireless terminal list 700 includes a terminal address 701, position information 702, and an adjacent terminal list 703.

The adjacent terminal list 703 includes a terminal address 704 and distance information 705.

In the terminal address 701, the address of the wireless terminal list 700 is stored. Here, the address is described in a simple form made only of the number of the wireless terminal.

In the position information 702, position coordinates of the wireless terminal 200 are stored identified by the terminal address 701. Here, example is shown in which three-dimension coordinates are stored.

In the adjacent terminal list 703, an adjacent terminal list is stored identified by the terminal address 701.

In the terminal address 704, the adjacent terminal address is stored.

In the distance information 705, the distance between the adjacent terminal identified by the terminal address 704 and the relevant wireless terminal.

In the position information 702, the adjacent terminal list 703, and distance information 705, it is allowable to store that it is undefined.

The holding method is not limited thereto if the above information can be held in full measure.

The communication section 110, positioning procedure management section 120, position calculation section 140, positioning object decision section 130, and terminal information storage section 150 owned by the positioning management terminal 100 and the communication section 210, distance measurement section 220, and range-finding data processing section 230 owned by the wireless terminal 200 can be configured using such as an LSI (Large Scale Integration), ROM (Read Only Memory), and RAM (Random Access Memory), on which a wireless transmission and reception circuit is implemented.

Alternatively, equivalent functions can be configured by operation devices such as a microcomputer and software specifying its operation.

Components of a single positioning management terminal 100 or wireless terminal 200 may be configured by being distributed into the terminals such as a plurality of microcomputers and personal computers. It is the same for embodiments below.

Descriptions have been given to each configuration of the wireless positioning system according to Embodiment 1 in the above.

Next, operations will be explained thereof.

In the explanation of Embodiment 1 as follows, the terminal address of the adjacent terminal of each wireless terminal 200 is supposed to be held in the adjacent terminal list 703 of the terminal information storage section 150 of the positioning management terminal 100 in advance.

The terminal address 701 of the adjacent terminal of each wireless terminal 200 is configured, for example, by manual input in advance. Alternatively, all terminals are supposed to be installed within a area capable of communication, for example, and the terminal addresses of all the wireless terminals 200 except the self terminal may be configured for the adjacent terminal list 703 corresponding to each wireless terminal 200.

Similarly, each wireless terminal 200 is installed in consideration of the communication distance, and a predetermined wireless terminal 200 may be configured in the adjacent terminal list 703.

In the explanation below, positions of at least (N+1) wireless terminals 200 are supposed to be configured in the position information 702 of the corresponding terminal address 701 in the terminal information storage section 150 of the positioning management terminal 100.

Alternatively, positions of (N+1) or more wireless terminals 200 are decided in advance, and each wireless terminal 200 may be placed at that position. Among a plurality of the placed wireless terminals 200, positions of (N+1) or more terminals may be manually input and configured.

Figure 8:
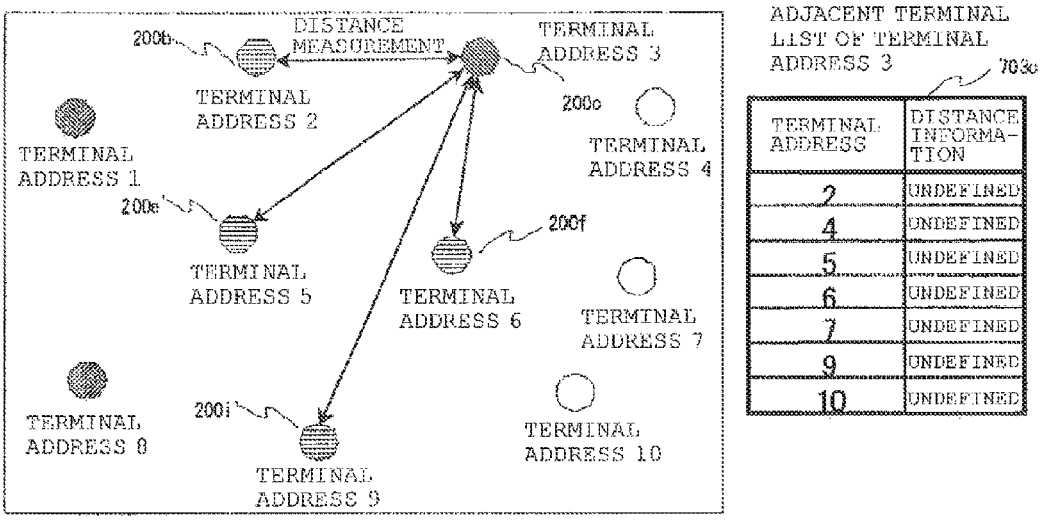
FIG. 8 is a conceptual diagram showing a state in which the position of the wireless terminals 200 is determined in order in the wireless positioning system of Embodiment 1.
Figure 8:
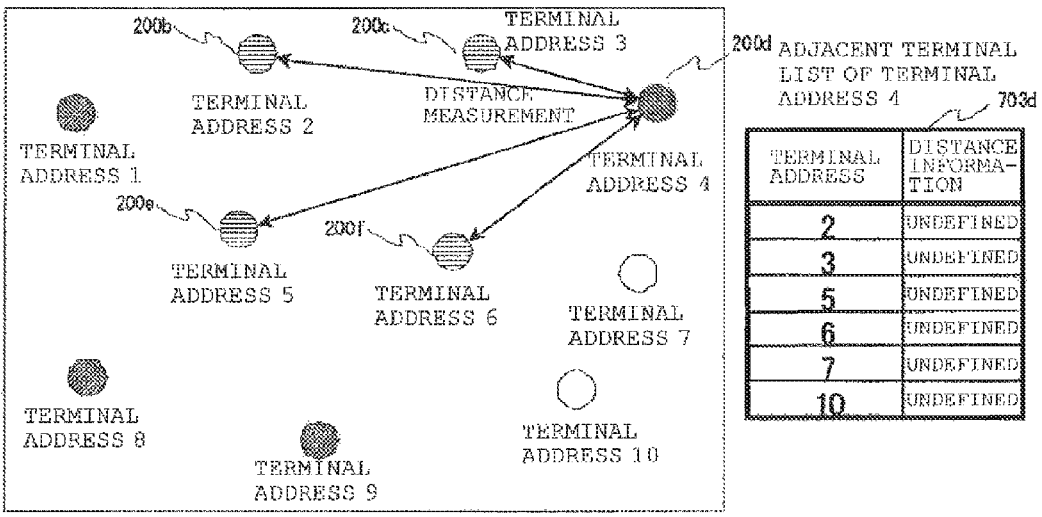

FIG. 8 is a conceptual diagram showing a state in which the position of each wireless terminal 200 is determined in order in the wireless positioning system of Embodiment 1. The positioning management terminal 100 is abbreviated.

The upper diagram of FIG. 8 shows the adjacent terminal list 703c of a certain wireless terminal 200c whose terminal address 701 is "3" at the time of a k-th positioning. The terminal to be positioned and the positioning standard terminal selected by the positioning management terminal 100 are shown as well.

The lower diagram of FIG. 8 shows the adjacent terminal list 703d of the wireless terminal 200d whose terminal address 701 is "4" at the time of the (k+1)-th positioning as well. The terminal to be positioned and the positioning standard terminal selected by the positioning management terminal 100 are shown by signs in the diagram.

In the k-th state (upper diagram of FIG. 8), position information 702 of the wireless terminals 200b, 200e, 200f, and 200i of the terminal addresses [2], [5], [6], and [9] is defined (the terminal in banding pattern) in the adjacent terminal list 703c of the wireless terminal 200c whose terminal address 701 is "3".

That is, upon calculating the three-dimension coordinates, position information of at least 3+1=4 adjacent terminals has been defined.

Therefore, the positioning object decision section 130 of the positioning management terminal 100 selects the wireless terminal 200c whose terminal address is "3" as the terminal to be positioned (a filled terminal) The wireless terminals 200b, 200e, 200f, and 200i of the terminal addresses [2], [5], [6], and [9] are selected as positioning standard terminals (the terminal in banding pattern).

The positioning procedure management section 120 of the positioning management terminal 100 obtains distance information 705 between the terminal to be positioned (the wireless terminal 200c) and the positioning standard terminals (the wireless terminals 200b, 200e, 200f, and 200i). The position calculation section 140 calculates the position of the terminal to be positioned (the wireless terminal 200c) using the distance information 705.

Similarly, in the (k+1)-th state at the time of positioning, position information 702 of the wireless terminals 200b, 200c, 200e, and 200f of the terminal addresses [2], [3], [5], and [6] is defined (the terminal in banding pattern) in the adjacent terminal list 703d of the wireless terminal 200d whose terminal address 701 is "4".

Therefore, the positioning object decision section 130 of the positioning management terminal 100 selects the wireless terminal 200d whose terminal address 701 is "4" as the terminal to be positioned (a filled terminal). The wireless terminals 200b, 200c, 200e, and 200f of the terminal addresses [2], [3], [5], and [6] are selected as positioning standard terminals (the terminal in banding pattern).

The positioning procedure management section 120 of the positioning management terminal 100 obtains distance information 705 between the terminal to be positioned (the wireless terminal 200d) and the positioning standard terminals (the wireless terminals 200b, 200c, 200e, and 200f). The position calculation section 140 calculates the position of the terminal to be positioned (the wireless terminal 200d) using the distance information 705.

Figure 9:
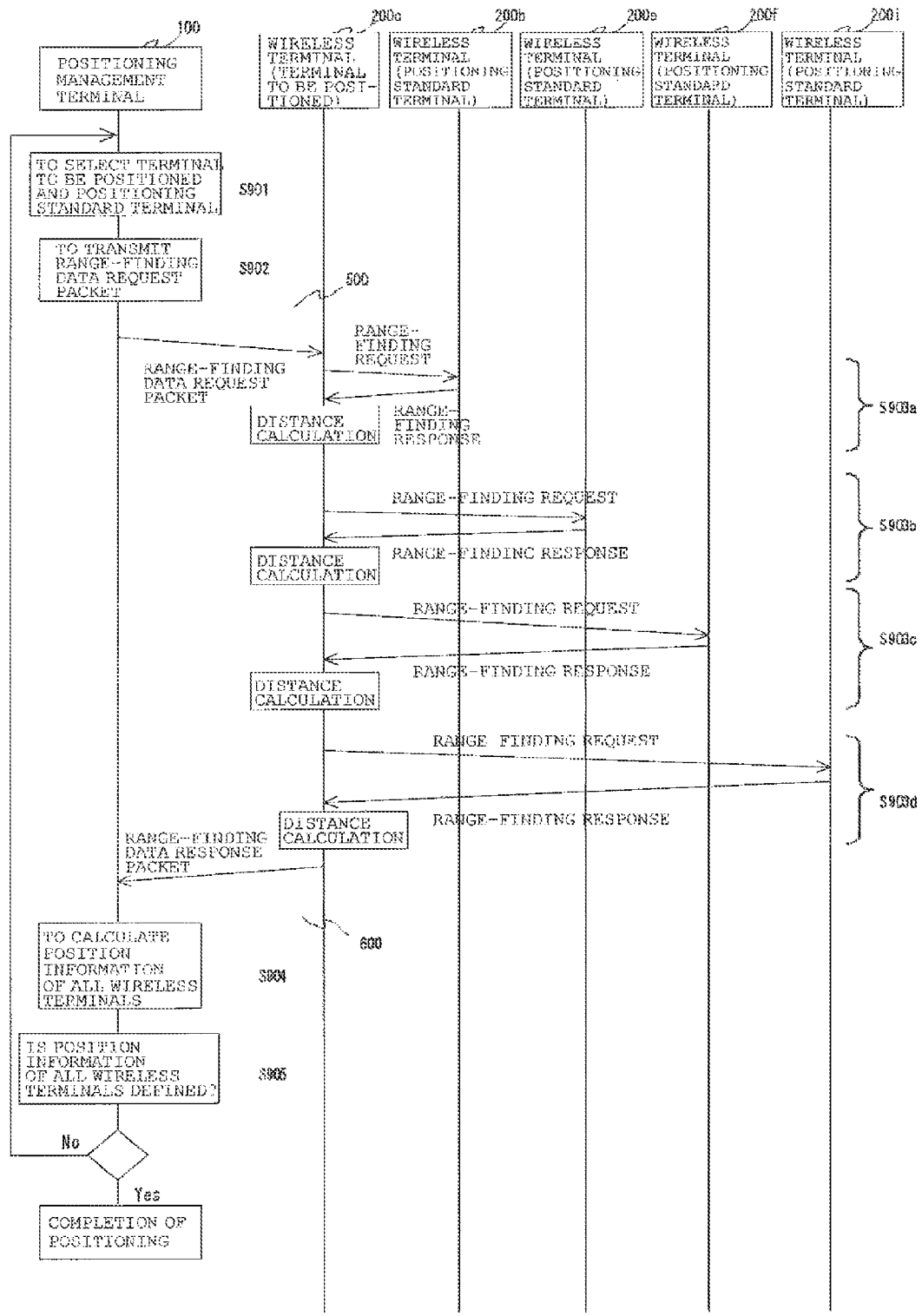
FIG. 9 is an entire operation sequence of the wireless positioning system of Embodiment 1.

FIG. 9 is an entire operation sequence of the wireless positioning system of Embodiment 1.

Descriptions will be given to each step of FIG. 9. Here, each operation under the state of the upper diagram of FIG. 8 will be explained as an example.

(S901)

The positioning object decision section 130 of the positioning management terminal 100 refers to information of the wireless terminal list 700 that the terminal information storage section 150 holds to select the next object to be positioned as the terminal to be positioned among the wireless terminals 200 whose position information 702 is undefined in the wireless terminal list 700. In the example of FIG. 8, for example, the wireless terminal 200c is selected.

The positioning object decision section 130 selects at least (N+1) positioning standard terminals for positioning the terminal to be positioned among the wireless terminals 200 whose position information 702 is defined in the wireless terminal list 700.

(S902)

The positioning procedure management section 120 transmits the range-finding data request packet 500 to the terminal to be positioned (the wireless terminals 200c) notified by the positioning object decision section 130 via the communication section 110.

In the range-finding object terminal address 505 of the range-finding data request packet 500, the terminal address of the positioning standard terminal (the wireless terminals 200b, 200e, 200f, and 200i) notified by the positioning object decision section 130 is stored.

(S903a to S903d)

The distance measurement section 220c of the terminal to be positioned (the wireless terminals 200c) that received the range-finding data request packet 500 performs positioning in order for the positioning standard terminals (here, the wireless terminals 200b, 200e, 200f, and 200i) stored in the range-finding object terminal address 505 of the range-finding data request packet 500.

The range-finding data processing section 230c collectively stores positioning results of the distance measurement section 220c into the range-finding data response packet 600 to transmit them to the positioning management terminal 100.

(S904)

The position calculation section 140 of the positioning management terminal 100 obtains the position information 702 of the positioning standard terminal selected by the positioning object decision section 130 and the distance information 705 between the terminal to be positioned and the positioning standard terminal selected by the positioning object decision section 130.

Next, the position calculation section 140 calculates the position of the terminal to be positioned (the wireless terminal 200) using the position information 702 and the distance information 705.

Calculated position of the terminal to be positioned (the wireless terminal 200) is stored in the position information 702 corresponded by the terminal information storage section 150.

According to the above procedure (S902 to S904), the position of the terminal to be positioned (the wireless terminal 200) selected by the positioning object decision section 130 is decided.

(S905)

The positioning procedure management section 120 judges whether the position information 702 of all the wireless terminals 200 in the wireless terminal list 700 has been defined or not.

If the position information 702 of all the wireless terminals 200 has been defined, the positioning procedure management section 120 concludes positioning. If the position information 702 of all the wireless terminals 200 has not been defined, the process returns to step S901 to repeat the same processing.

Figure 10:
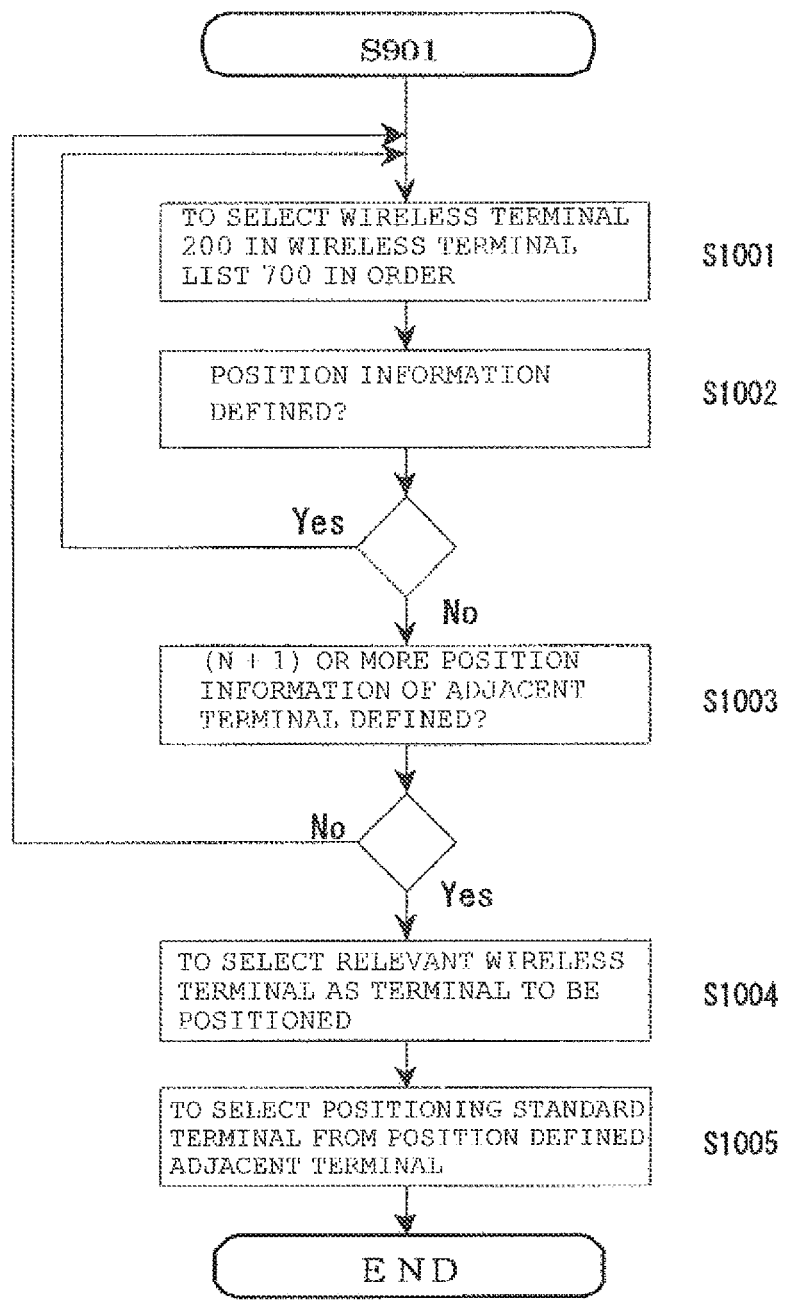
FIG. 10 is a flow chart illustrating details of step S901 of FIG. 9.

FIG. 10 is a flow chart illustrating details of step S901 of FIG. 9. Descriptions will be given to each step of FIG. 10.

(S1001)

The positioning object decision section 130 of the positioning management terminal 100 selects the wireless terminals 200 in order in the wireless terminal list 700 stored by the terminal information storage section 150.

(S1002)

The positioning object decision section 130 judges whether the position information 702 of the wireless terminals 200 selected in step S1001 has been defined or not. If not yet defined, proceed to step S1003. If defined, return to step S1001 to select the next wireless terminal 200. This step is intended for searching a candidate of the terminal to be positioned.

(S1003)

With regard to the wireless terminal 200 whose position information 702 has not been defined, the positioning object decision section 130 refers to the adjacent terminal list 703 of the wireless terminal 200. Next, the positioning object decision section 130 judges whether at least (N+1) or more wireless terminals 200 whose position information 702 has been defined are included in the adjacent terminal list 703.

If (N+1) or more have been defined, proceed to step S1004. If not, return to step S1001 to select the next wireless terminal 200.

(S1004)

The positioning object decision section 130 selects the wireless terminals 200 whose position information 702 has not been defined as the terminal to be positioned.

(S1005)

The positioning object decision section 130 selects any of (N+1) wireless terminals 200 among adjacent terminals of the terminal to be positioned selected in step S1004 as the positioning standard terminal.

If (N+1) or more adjacent terminals whose position information 702 has been defined are not included, the same judgment as S1001 and S1002 is performed for the next wireless terminals 200 whose position information 702 has been defined.

Details of step S901 are explained in the above.

As described in FIG. 10, by selecting the terminal to be positioned and the positioning standard terminal, the terminal to be positioned can be selected that can define the position based on range-finding data.

The positioning object decision section 130 informs the positioning procedure management section 120 of the terminal addresses 701 of the selected terminal to be positioned and the positioning standard terminal.

Operation of the wireless positioning system according to Embodiment 1 is explained in the above.

As mentioned above, according to Embodiment 1, the position of the wireless terminals 200 whose position information 702 has not been defined is calculated in order by distance information 705 between the wireless terminals 200 whose position information 702 has been defined.

Thereby, position information 702 of all the wireless terminals 200 can be calculated.

According to Embodiment 1, the positioning management terminal 100 calculates position information 702 of all the wireless terminals 200 while selecting the positioning standard terminal and the terminal to be positioned in order.

Therefore, without separately installing base stations over a wide area and configuring their positions in advance, it is possible to calculate position information 702 of each wireless terminals 200 based on position information of already installed wireless terminals 200.

According to Embodiment 1, with the wireless terminals 200 incapable of direct communication with each other, the positioning management terminal 100 transmits the range-finding data request packet 500 to the wireless terminals 200 selected as the terminal to be positioned by a multi-hop communication.

The wireless terminal 200 that received the range-finding data request packet 500 transmits the range-finding data response packet 600 including the measured distance information 606 to the positioning management terminal 100 again by the multi-hop communication.

Thereby, since the positioning management terminal 100 can finalize position information 702 of the wireless terminals 200 in order, position information 702 of all the wireless terminals 200 can be decided in the wireless positioning system in which the wireless terminals 200 are installed over a wide range.

In Embodiment 1, mutual distance of all the wireless terminals 200 is not measured but only the distance between the terminal to be positioned and the positioning standard terminal selected by the positioning management terminal 100 may be measured. Thereby, communication amount for range-finding can be reduced.

That is, with N wireless terminals 200, frequency of communication in proportion to N squared is necessary for measuring the distance among all the adjacent terminals. However, in Embodiment 1, frequency of communication in proportion to N will suffice.

Thus, communication amount can be drastically reduced required for measuring positions of a number of units.

In Embodiment 1, the positioning management terminal 100 calculates position information 702 of all the wireless terminals 200 while selecting the positioning standard terminal and the terminal to be positioned in order.

Therefore, there is no distinction between the base station and the terminal to be positioned like a conventional positioning method.

Accordingly, by providing devices installed at a suitable interval in a building facility, for example, with the wireless terminal 200 according to Embodiment 1, it becomes possible to obtain the position of each device without separately installing a base station.

Embodiment 2

Figure 11:
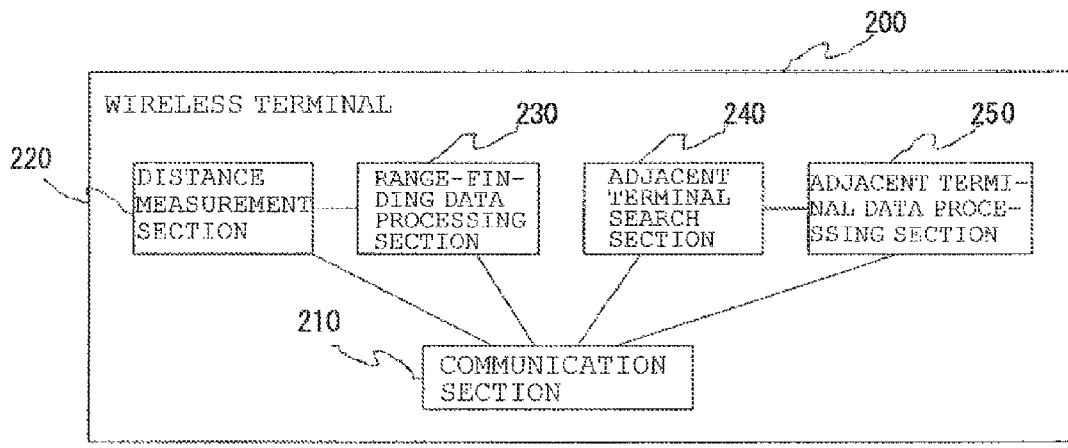
FIG. 11 is a function block diagram of the wireless terminal of Embodiment 2.

FIG. 11 is a function block diagram of the wireless terminal 200 of Embodiment 2. The wireless terminal 200 of Embodiment 2 newly includes the adjacent terminal search section 240 and the adjacent terminal data processing section 250 in addition to the wireless terminal 200 of Embodiment 1. The other configurations are the same with FIG. 3.

The adjacent terminal search section 240 obtains information on the adjacent terminal of the wireless terminal 200. The procedure to obtain information on the adjacent terminal will be explained in FIG. 12 to be mentioned later.

The adjacent terminal data processing section 250 transmits and receives the adjacent terminal data request packet 1300 and the adjacent terminal data response packet 1400 described in FIGS. 13 and 14 to be mentioned later with the positioning management terminal 100. The adjacent terminal data processing section 250 also transmits and receives the adjacent terminal search packet and the adjacent terminal search response packet described in FIG. 12 to be mentioned later.

The adjacent terminal data processing section 250 can deliver the adjacent terminal data request packet 1300 and the adjacent terminal data response packet 1400 via the communication section 210 to the wireless terminal 200 and the positioning management terminal 100 to which no wireless signal is directly delivered by multi-hop communication.

On receiving the adjacent terminal data request packet 1300, the adjacent terminal data processing section 250 of the wireless terminal 200 stores the address of the adjacent terminal that the adjacent terminal search section 240 obtained into the adjacent terminal data response packet 1400 to transmit the same to the transmission source of the adjacent terminal data request packet 1300.

The adjacent terminal search section 240 and the adjacent terminal data processing section 250 can be configured using LSI, ROM, RAM and the like that implemented a wireless transmission and reception circuit.

Alternatively, similar functions can be configured by operation devices such as microcomputers and software defining their operations.

Figure 12:
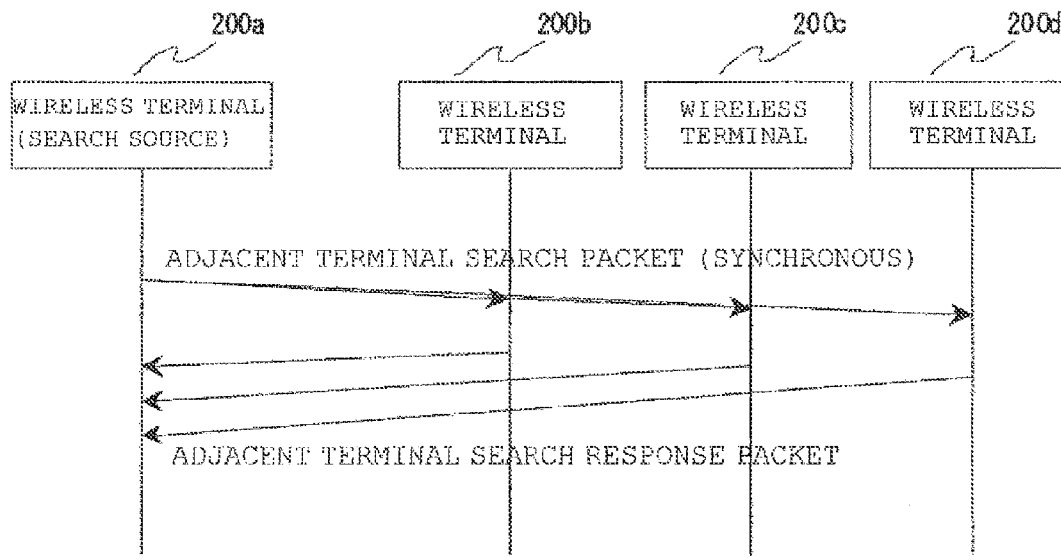
FIG. 12 is an operation sequence diagram when the wireless terminal 200a receives an adjacent terminal data request packet 1300.

FIG. 12 is an operation sequence diagram when the wireless terminal 200a receives an adjacent terminal data request packet 1300.

The adjacent terminal data processing section 250a of the wireless terminal 200a receives adjacent terminal data request packet 1300 described in FIG. 13 to be mentioned later through the communication section 210.

Next, the adjacent terminal search section 240a transmits the adjacent terminal search packet by synchronous transmission.

The adjacent terminal data processing section 250 of the wireless terminal 200 (here, 200b to 200d) that received the adjacent terminal search packet transmits the adjacent terminal search response packet to the wireless terminal 200a.

The adjacent terminal search section 240 of the wireless terminal 200a, which is a search source, holds the transmission source address of the adjacent terminal search response packet in a memory, etc.

Thereby, the wireless terminal 200a can obtain information on the adjacent terminal of its own.

Upon receiving the adjacent terminal data request packet 1300, the adjacent terminal search section 240 may correspond to information of the adjacent terminal obtained by searching the adjacent terminal, or may respond to the adjacent terminal data already obtained.

In the case of a number of adjacent terminals, the adjacent terminal search section 240 may correspond to the adjacent terminal information by dividing data into a plural packet.

Figure 13:
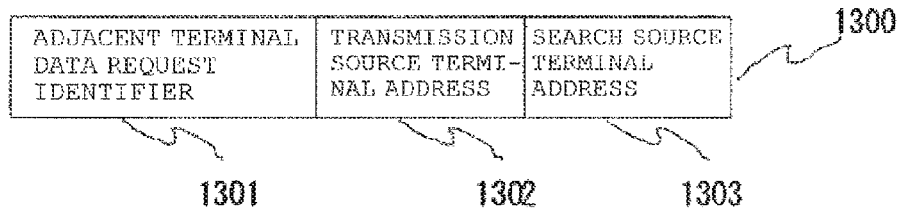
FIG. 13 is a configuration diagram of the adjacent terminal data request packet 1300.

FIG. 13 is a configuration diagram of the adjacent terminal data request packet 1300.

The adjacent terminal data request packet 1300 includes an adjacent terminal data request identifier 1301, a transmission source terminal address 1302, and a search source terminal address 1303.

In the adjacent terminal data request identifier 1301, an identifier is stored stating that the relevant packet is the adjacent terminal data request packet.

In the transmission source terminal address 1302, the transmission source terminal address of the relevant packet is stored.

In the search source terminal address 1303, the address of the terminal (the wireless terminal 200a in the example of FIG. 12) is stored that searches the adjacent terminal by receiving the relevant packet.

Figure 14:
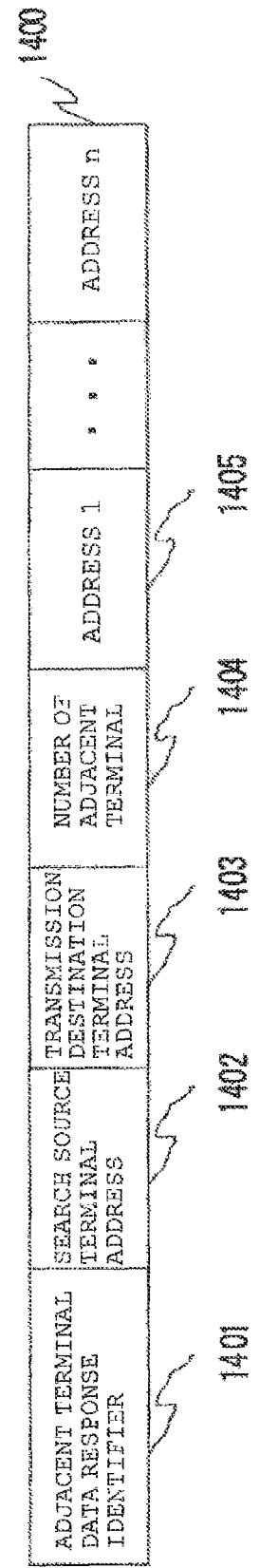
FIG. 14 is a configuration diagram of an adjacent terminal data response packet 1400.

FIG. 14 is a configuration diagram of a adjacent terminal data response packet 1400.

The adjacent terminal data response packet 1400 includes an adjacent terminal data response identifier 1401, a search source terminal address 1402, a transmission destination terminal 1403, number of the adjacent terminal 1404, and an adjacent terminal address 1405.

In the adjacent terminal data response identifier 1401, an identifier is stored stating that the relevant packet is the adjacent terminal data response packet.

In the search source terminal address 1402, the terminal (the wireless terminal 200a in the example of FIG. 12) address is stored that collected search results of the transmission source of the relevant packet, that is, the adjacent terminal.

In the transmission destination terminal 1403, the terminal address is stored that transmits the transmission destination terminal of the relevant packet, that is, the adjacent terminal data request packet 1300.

In the adjacent terminal number 1404, the number of the adjacent terminals (three in the example of FIG. 12) of the wireless terminal is stored that transmits the relevant packet.

In the adjacent terminal address 1405, the adjacent terminal (the wireless terminals 200b to 200d in the example of FIG. 12) address of the wireless terminal is stored that transmits the relevant packet.

Figure 15:
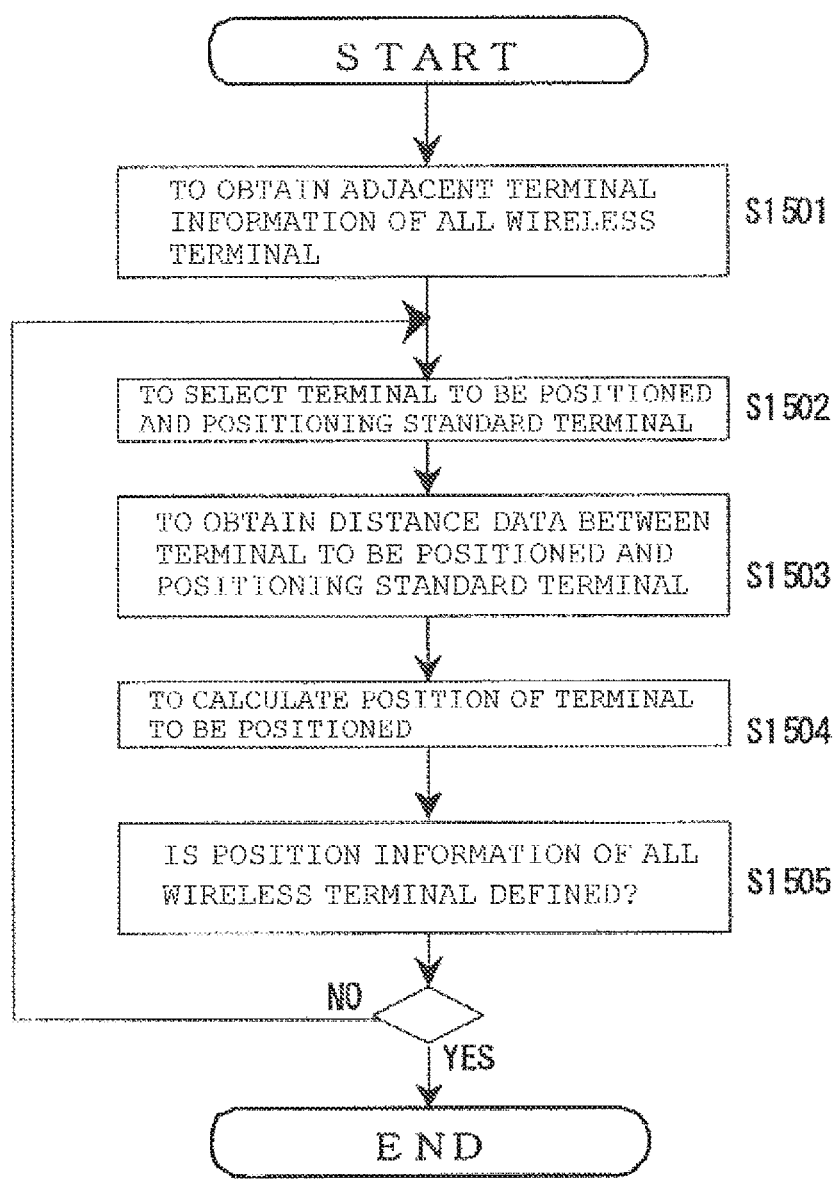
FIG. 15 is a flow chart of positioning procedure of Embodiment 2.

FIG. 15 is a flow chart of positioning procedure of Embodiment 2. In the following, each step of FIG. 15 will be explained.

(S1501)

The positioning management terminal 100 transmits the adjacent terminal data request packet 1300 to all the wireless terminals 200 to obtain the adjacent terminal information on each wireless terminal 200 included in the adjacent terminal data response packet 1400.

In Embodiment 1, it is assumed that information of the adjacent terminal has been set in the terminal information storage section 150 of the positioning management terminal 100 in advance prior to positioning operation. However, Embodiment 2 is different from Embodiment 1 in that the present step collects the adjacent terminal information.

(S1502) to (S1505)

The same procedure with the steps S901 to S905 described in FIG. 9 of Embodiment 1.

As mentioned above, in Embodiment 2, each wireless terminal 200 is adapted to automatically obtain the adjacent terminal address through the mutual communication.

Therefore, after installing the wireless terminal 200, position information 702 of all the wireless terminals 200 can be automatically calculated. Accordingly, pre-configuration can be drastically reduced necessary for obtaining positions of the wireless terminals 200 installed over a wide area.

Embodiment 3

Figure 16:
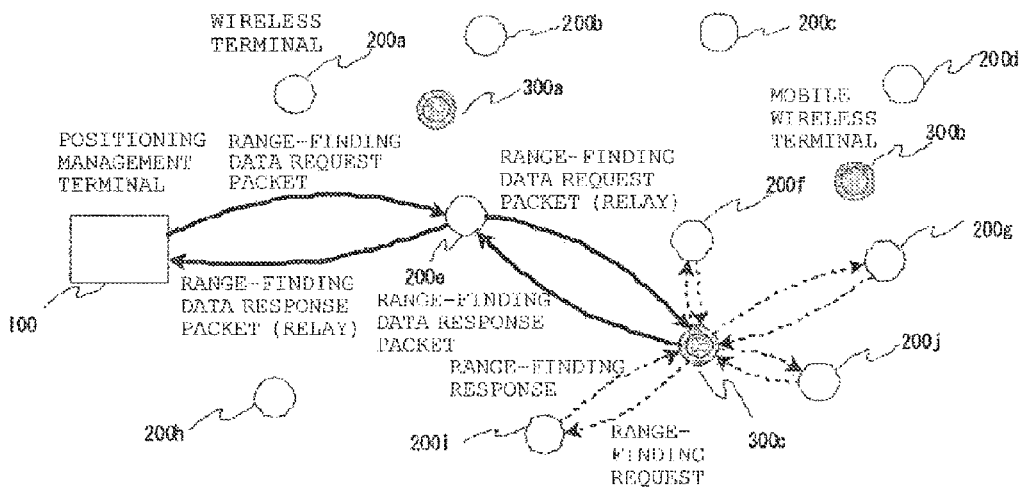
FIG. 16 is a configuration diagram of the wireless positioning system of Embodiment 3.

FIG. 16 is a configuration diagram of the wireless positioning system of Embodiment 3.

The wireless positioning system according to Embodiment 3 includes mobile wireless terminals 300a to 300c in addition to the wireless positioning system configured in Embodiments 1 and 2.

The positioning management terminal 100 according to Embodiment 3 includes a similar configuration to the positioning management terminal 100 according to Embodiments 1 and 2.

The terminal information storage section 150 of the positioning management terminal 100 according to Embodiment 3 stores the terminal address 701, position information 702, and the adjacent terminal list 703 regarding the mobile wireless terminal 300 as well in addition to information that the terminal information storage section 150 in Embodiments 1 and 2 stores.

The positioning object decision section 130 of the positioning management terminal 100 according to Embodiment 3 selects a positioning standard terminal for positioning the mobile wireless terminal 300 from the adjacent terminal information regarding the mobile wireless terminal 300 and position information 702 of the wireless terminal 200 in addition to the positioning object decision section 130 in Embodiments 1 and 2.

The positioning procedure management section 120 of the positioning management terminal 100 according to Embodiment 3 manages procedure for positioning the mobile wireless terminal 300 in addition to the positioning procedure management section 120 in Embodiments 1 and 2.

Since the position calculation section 140 and the communication section 110 of the positioning management terminal 100 in Embodiment 3 are the same as those of in Embodiments 1 and 2, descriptions will be omitted.

The configuration of the wireless terminal 200 according to Embodiment 3 is the same as that of the wireless terminal 200 according to Embodiments 1 and 2. Each component of the wireless terminal 200 is the same.

Figure 17:
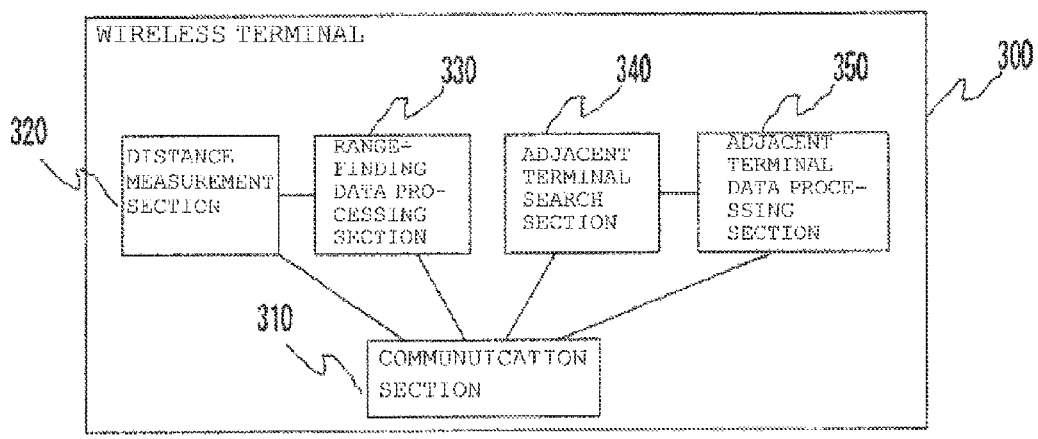
FIG. 17 is a function block diagram of a mobile wireless terminal 300.

FIG. 17 is a function block diagram of a mobile wireless terminal 300.

The mobile wireless terminal 300 has the same configuration as the wireless terminal 200 according to Embodiment 3. Functions of each component are the same as those explained in Embodiment 2.

As mentioned above, each configuration of the wireless positioning system according to embodiment 3 is explained. Next, descriptions will be given to operation thereof.

Figure 18:
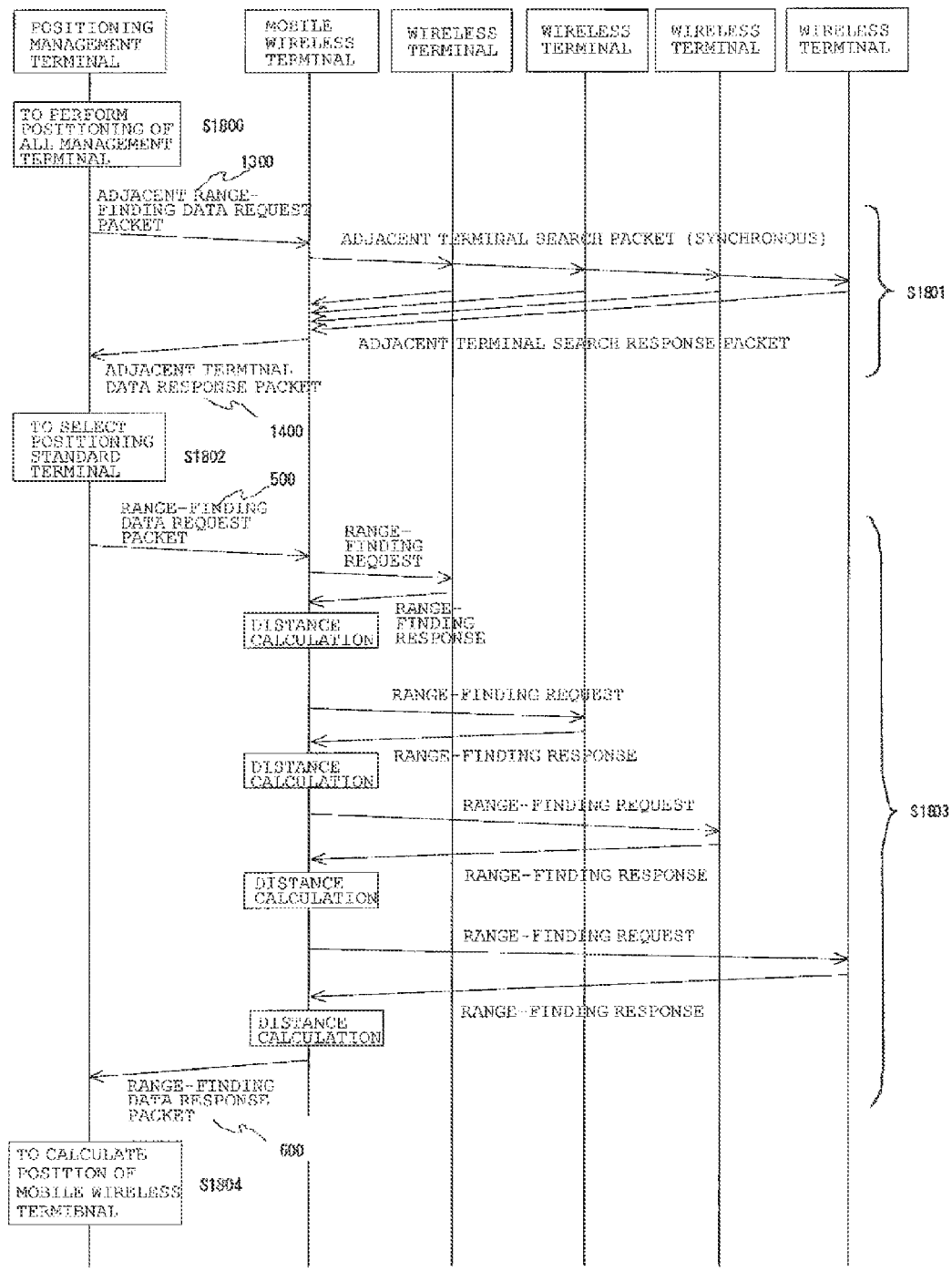
FIG. 18 is an entire operation sequence of the wireless positioning system of Embodiment 3.

FIG. 18 is an entire operation sequence of the wireless positioning system of Embodiment 3. In the following, each step in FIG. 18 will be explained.

After the operation to obtain position information 702 of all the wireless terminals 200 in Embodiments 1 and 2, an operation for calculating the position of the mobile wireless terminal 300 is further added to make the operations in Embodiment 3.

(S1800)

The positioning management terminal 100 performs positioning of all the wireless terminals 200 by the method explained in Embodiments 1 and 2. Next, the positioning management terminal 100 performs an operation to calculate the position of the mobile wireless terminal 300 explained in the following.

(S1801)

The positioning procedure management section 120 of the positioning management terminal 100 transmits the adjacent terminal data request packet 1300 to the mobile wireless terminal 300 that calculates a position via the communication section 110 to obtain the adjacent terminal of the mobile wireless terminal 300. As for how to obtain the adjacent terminal, method explained in Embodiment 2 is employed (S1802)

The positioning object decision section 130 of the positioning management terminal 100 selects (N+1) wireless terminals 200 whose positions are defined as a positioning standard terminal among the adjacent terminals of the mobile wireless terminals 300 that the terminal information storage section 150 stores.

When selecting the positioning standard terminal, it may be randomly selected among (N+1) or more wireless terminals 200 whose positions are defined. A combination of the wireless terminals 200 having the highest evaluation may be selected using a suitable evaluation function.

(S1803)

The positioning procedure management section 120 of the positioning management terminal 100 generates a range-finding data request packet 500 whose range-finding object terminal address 505 is the address of the positioning standard terminal selected by the positioning object decision section 130 with the mobile wireless terminal 300 being the terminal to be positioned.

Next, the positioning procedure management section 120 transmits the range-finding data request packet 500 to the mobile wireless terminal information storage section 300 via the communication section 110.

Upon receiving the range-finding data request packet 500, the mobile wireless terminal 300 performs range-finding with the wireless terminal 200 specified by the range-finding object terminal address 505 to transmit the range-finding data response packet 600 to the positioning management terminal 100.

(S1804)

When the positioning management terminal 100 receives the range-finding data response packet 600, the position calculation section 140 calculates the position of the mobile wireless terminal 300.

As for the positioning of the mobile wireless terminal 300, the positioning management terminal 100 may perform positioning of positioning of each mobile wireless terminal 300 on a regular basis. Alternatively, from the mobile wireless terminal 300, a signal (not shown) to require positioning of the self terminal is transmitted to the positioning management terminal 100. Upon receiving the signal, the positioning management terminal 100 may perform positioning of the mobile wireless terminal 300.

Further, the user may command the positioning management terminal 100 to perform positioning, and the positioning of the mobile wireless terminal 300 may be performed according to the command.

As mentioned above, in Embodiment 3, (N+1) or more wireless terminals 200 are selected as positioning standard terminals among the wireless terminals 200 automatically positioned by obtaining the adjacent terminal. The distance between the positioning standard terminal and the mobile wireless terminal 300 is measured to position the mobile wireless terminal 300.

Thereby, the mobile wireless terminal 300 can be positioned without installing a number of base stations over a wide area to configure positions of the base stations.

Therefore, pre-configuration can be drastically reduced necessary for, positioning the positioning standard terminal 300.

Embodiment 4

In the above-mentioned Embodiments 1 to 3, a procedure for the position calculation section 140 to calculate the position of the terminal to be positioned can be as follows.

(Position Calculation Method 1)

The position calculation section 140 obtains the intersection of a circle whose radius is equal to position information 705 between the terminal to be positioned and each positioning standard terminal as the position of the terminal to be positioned with the position of each positioning standard terminal being the center.

(Position Calculation Method 2)

$P_i$ (i=1 . . . k) denotes the position of each positioning standard terminal, $P_t$ denotes the position of the terminal to be positioned, and $d_i$ (i=1 . . . k) denotes the distance between each positioning standard terminal and the terminal to be positioned.

The position calculation section 140 calculates the position of the terminal to be positioned whose distance error becomes minimum by calculating $P_t$ that makes a evaluation function $\epsilon$ ($P_t$) as follows minimum, for example, using least-square method.

$$\varepsilon(p_t) = \sum_{i=1}^{k} (|p_i - p_t| - d_k)^2 \quad \text{[Formula 1]}$$

Embodiment 5

In Embodiment 5 of the present invention, descriptions will be given to the method of evaluating measurement accuracy of the terminal to be positioned. The configuration of the wireless positioning system and each terminal is the same as Embodiments 1 to 4.

In Embodiment 5, when the terminal to be positioned has (N+1) adjacent terminals whose positions are defined, the positioning object decision section 130 of the positioning management terminal 100 evaluates the combination of the wireless terminals 200 to be a candidate for the positioning standard terminal according to, for example, an evaluation function as follows to select the combination of the wireless terminals 200 having the highest evaluation as the positioning standard terminal.

(Evaluation Function 1): Determinant: 1

For example, among adjacent terminals for which (N+1) or more position information 702 has been defined, regarding a combination of the wireless terminals 200 to be the positioning standard terminal, the position of the positioning standard terminal is made to be $\{P_0, P_1, \ldots, P_N\}$, respectively.

Among them, the following determinant M is made to be an evaluation function, whose element is a difference vector between $\{P_1, \ldots, P_N\}$ and $\{P_0\}$.

$$M = [p_1 - p_0, \ldots, p_N - p_0] \quad \text{[Formula 2]}$$

The positioning object decision section 130 calculates values of the evaluation function regarding the combination of all the wireless terminals 200 to be a candidate of the positioning standard terminal to select the combination having the highest value of the evaluation function as the positioning standard terminal.

In general, when the positioning standard terminals of three points are on the same straight line in the calculation of the two-dimensional position, and when the positioning standard terminals of four points are on the same plane in the calculation of the three-dimensional position, a plurality of calculation position candidates exist and measurement accuracy is deteriorated.

The above evaluation function denotes a dispersion degree in position relation of the positioning standard terminal.

Thus, by selecting the combination having a higher value of the evaluation function, the positioning standard terminal having more dispersed position relation enables measurement of the position of the position of the positioning standard terminal, resulting in improvement of measurement accuracy.

(Evaluation Function 2) Determinant: 2

Similarly, the same effect will be obtained by making the following determinant M to be the evaluation function, whose element is a normalized difference vector between $\{P_1, \ldots, P_N\}$ and $\{P_0\}$.

$$M = \left[ \frac{p_1 - p_0}{|p_1 - p_0|}, \ldots, \frac{p_N - p_0}{|p_N - p_0|} \right] \quad \text{[Formula 3]}$$

(Evaluation Function 3): Evaluation of Accuracy of Calculated Position: 1

$P_i$ denotes the position of the wireless terminal 200 (suffix is made to be i) whose position information 702 is defined. $D_{ij}$ denotes the distance information 705 with other wireless terminal 200 (suffix is made to be j) whose position information 702 is defined. The positioning object decision section 130 calculates an evaluation value $g_i$ as follows.

$$g_t = \frac{1}{N} \sum_{j}^{N} (|p_t - p_j| - d_{ij})^2 \quad \text{[Formula 4]}$$

N is the number of the adjacent terminal whose position information 702 has been defined and distance information 705 has been obtained among the adjacent terminals of the wireless terminal i in the terminal information storage section 150 of the positioning management terminal 100.

Next, among the adjacent terminals whose position information 702 has been defined, the positioning object decision section 130 selects (N+1) terminals having a smaller evaluation value $g_i$ in order to select as the positioning standard terminal.

The evaluation value $g_i$ denotes a degree of difference between a distance calculated by the position relation calculated by the position calculation section 140 and distance information 705 obtained from the distance measurement section 220. The smaller the value $g_i$, the more the position calculated by the position calculation section 140 corresponds with the distance information 705 obtained by the measurement of the distance measurement section 220.

That is, the smaller the evaluation value $g_i$, the higher the position accuracy calculated by the position calculation section 140.

Accordingly, by employing the combination of the positioning standard terminal having the smallest evaluation value $g_i$, the terminal to be positioned can be positioned with the wireless terminal 200 having a high calculation position accuracy being the positioning standard terminal, resulting in improvement of positioning accuracy of the terminal to be positioned.

(Evaluation Function 4): Evaluation of Accuracy of Calculated Position: 2

A value denoting the accuracy of the calculated position as follows may be used as the evaluation value $g_i$, for example.

$$g_i = \frac{1}{N} \sum_{j}^{N} \left( \frac{|p_i - p_j| - d_{ij}}{d_{ij}} \right)^2 \quad \text{[Formula 5]}$$

OR $$g_i = \frac{1}{N} \sum_{j}^{N} \left( \frac{|p_i - p_j| - d_{ij}}{|p_i - p_j|} \right)^2$$

In general, the distance information 705 measured by wireless includes errors. The position information 702 calculated by the distance information 705 including errors also includes errors.

When calculating the position of the next wireless terminal 200 using the position information 702 including errors, calculation position errors of the terminal to be positioned are supposed to grow as the procedure advances.

Therefore, by selecting the positioning standard terminal capable of improving positioning accuracy of the terminal to be positioned like the above (evaluation function 3) and (evaluation function 4) to calculate positions in order, a wireless positioning system having a few position errors can be obtained.

In Embodiment 5, when there are a plurality of the wireless terminals 200 in which (N+1) or more position information 702 of the adjacent terminals is defined, the positioning object decision section 130 may select the combination of the highest evaluation as the terminal to be positioned and the positioning standard terminal by evaluating combinations of the wireless terminals 200 that could all be the positioning standard terminals of all the wireless terminals 200 according to the above evaluation function.

Thus, the combination of the wireless terminals 200 having the highest positioning accuracy of the terminal to be positioned can be positioned as the positioning standard terminal, resulting in the improvement of positioning accuracy of the entire wireless positioning system.

Embodiment 6

In Embodiment 6 of the present invention, descriptions will be given to a method in which position information 702 of the wireless terminal 200 is calculated as relative coordinates in place of absolute coordinates to be stored in the terminal information storage section 150. Configurations of the wireless positioning system and each terminal is the same as Embodiments 1 to 5.

Figure 19:
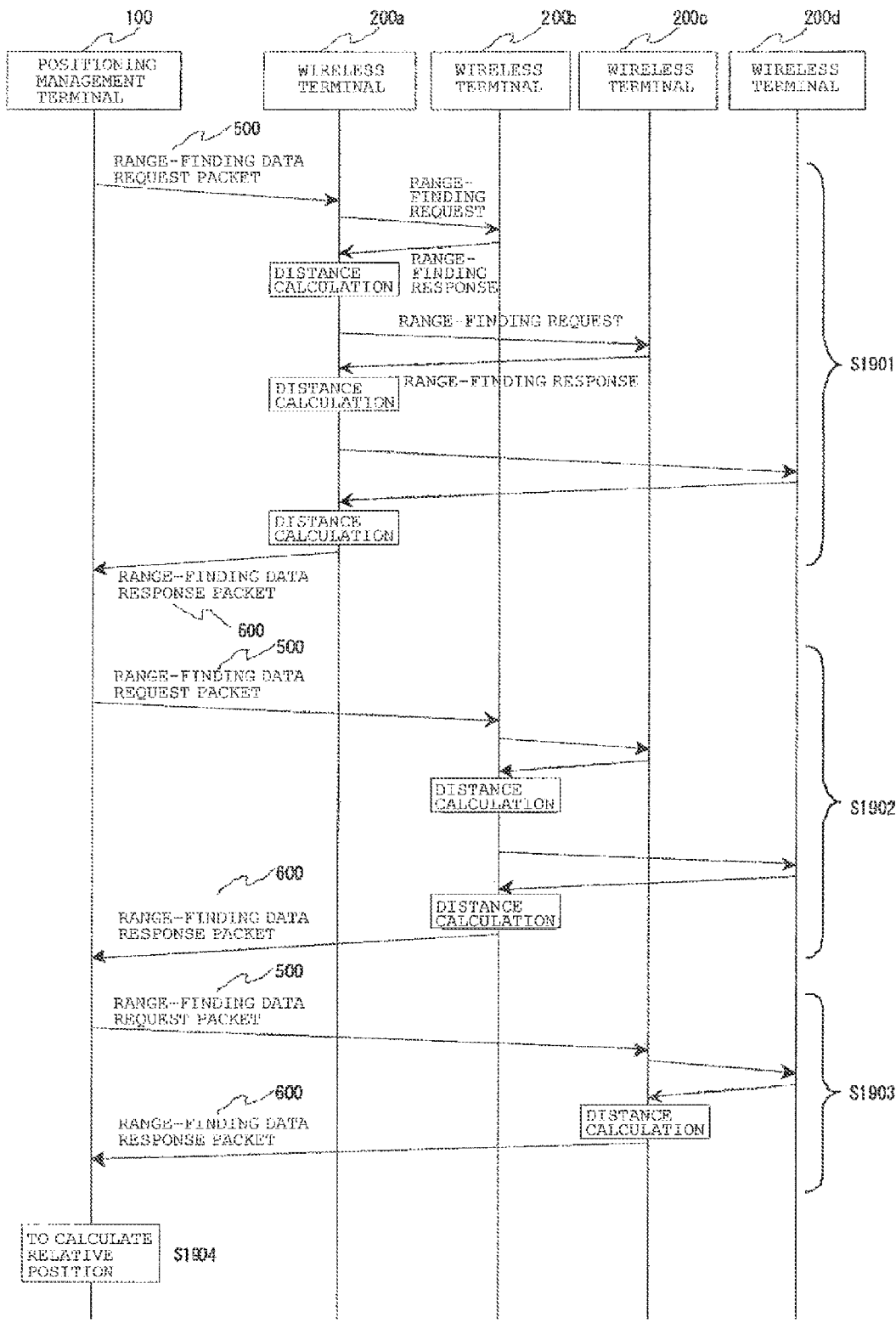
FIG. 19 is a sequence diagram showing procedure in which relative positions of the wireless terminals 200 of (N+1) or more are obtained and stored in position information 702.

FIG. 19 is a sequence diagram showing procedure in which relative positions of the wireless terminal 200 of (N+1) or more are obtained and stored in position information 702. Each step of FIG. 19 will be explained as follows.

(S1901)

The positioning procedure management section 120 of the positioning management terminal 100 selects k (k is an integer greater than N+1) wireless terminals 200 (here, k=4 and suffixes are a to d) to be adjacent terminals each other from information of the adjacent terminal that terminal information storage section 150 stores.

The positioning procedure management section 120 transmits the range-finding data request packet 500 including addresses of the wireless terminals 200b to 200d as range-finding object terminal addresses 505 to the wireless terminal 200a.

Upon receiving the range-finding data request packet 500, the wireless terminal 200a performs range-finding among the wireless terminals 200b to 200d to transmit the range-finding data response packet 600 to the positioning management terminal 100.

(S1902) to (S1903)

The positioning management terminal 100 transmits the range-finding data request packet 500 including addresses of the wireless terminals 200b to 200d whose distances are undefined as range-finding object terminal addresses 505 to the wireless terminals 200b to 200d to obtain mutual distance information 705 of the wireless terminals 200a to 200d.

(S1904)

The position calculation section 140 of the positioning management terminal 100 calculates relative positions of the wireless terminals 200a to 200d from obtained mutual distance information 705.

For example, in the case where three-dimension positions of the wireless terminals 200a to 200d are obtained, the position of the wireless terminal 200a is made to be $P_1=(0, 0, 0)$, that of the wireless terminal 200b $P_2=(x_2, 0, 0)$, that of the wireless terminal 200c $P_3=(x_3, y_3, 0)$, and the positions except 200a to 200c among k wireless terminals 200 being made to be $P_i=(x_i, y_i, z_i)$ (i=4, . . . , k, x, y, and z are unknown)

The position calculation section 140 can obtain relative positions of each wireless terminal 200 with the position of p1 being an origin by obtaining a position that makes a difference between a distance obtained from the calculated position and the measured distance information 705 to be minimum.

Thus, by calculating the relative position to store it into the position information 702, the wireless terminal 200 can be obtained whose (N+1) or more position information 702 have been confirmed prior to start of the position calculation operation.

Thereby, with no configuration of the positions of (N+1) or more wireless terminals 200, the positions of all the wireless terminals 200 can be obtained.

With the method above, relative position may possibly be obtained which may be a mirror-symmetry or may be subjected entirely to rotational transfer or parallel displacement against a true position, however, a manual input by input means (not shown) may be allowable to correct the mirror-symmetry and rotation to perform correction.

Thereby, position information 702, in which mirror-symmetry and rotated position are corrected, is obtained and the position equivalent to the true position can be obtained.

The above mentioned relative position may be calculated from mutual distance information 705 of the wireless terminal 200 by determining only signs of unknown variables of the above-mentioned $P_2=(x_2, 0, 0)$ and $P_3=(x_3, y_3, 0)$ in advance to install such that the position relation in the predetermined k wireless terminals 200 should have predetermined signs.

Thereby, the position equivalent to the true position can be obtained with neither mirror-symmetry nor rotation of the whole by the installation with only signs of the position relation being matched with coordinates for calculating the position.

Embodiment 7

In Embodiment 7 of the present invention, descriptions will be given to a method of recalculating the calculated position information 702 after positioning to correct and improve accuracy. The configuration of the wireless positioning system and each terminal is the same as Embodiments 1 to 6.

(Recalculation Method 1)

The position calculation section 140 of the positioning management terminal 100 refers again to the distance information 705 and the position information 702 that the terminal information storage section 150 stores after the completion of the positioning to recalculate the position of each wireless terminal 200.

When the position calculation section 140 recalculates position information, since much more distance information 705 is stored in the terminal information storage section 150 compared with the above-mentioned step in the middle of the positioning operation, positioning accuracy can be further improved using the distance information 705.

(Recalculation Method 2)

After all the positioning procedures are completed and positioning is concluded, the position calculation section 140 of the positioning management terminal 100 transmits the range-finding data request packet 500 regarding part of or all the distance information 705 among undefined distance information 705 to correct position information 702 upon increasing the number of data of distance information 705.

Through this method, by increasing the number of data of distance information 705, accuracy can be more precisely improved.

Regarding the adjacent terminal whose distance information 705 is undefined, the above-mentioned evaluation value $g_i$ is calculated and only distance information 705 of the adjacent terminal whose evaluation value $g_i$ is smaller than a predetermined threshold value (=position information is high) is added, and the undefined distance information 705 is obtained.

By additionally obtaining distance information 705 of the adjacent terminal having a smaller evaluation value $g_i$ and calculating the position using distance information 705, distance information 705 of the wireless terminal 200 whose position is more precisely measured can be used, resulting in the improvement of positioning accuracy of the wireless terminal 200.

(Recalculation Method 3)

Regarding the combination of (N+1) or more wireless terminals 200, the position calculation section 140 of the positioning management terminal 100 calculates the number of the wireless terminals 200 to be an adjacent terminal in common from each wireless terminals 200 included in the combination for each combination after all the positioning procedures are completed and positioning is concluded.

Next, the combination having the maximum number is selected as the positioning standard terminal. The wireless terminal 200 for which the combination becomes the adjacent terminal in common is selected as the terminal to be positioned respectively. Then, the position of each terminal to be positioned is calculated.

Thus, the position of the terminal to be positioned is calculated based on the position information 702 of the common positioning standard terminal, allowing to prevent the above-mentioned problem of propagation of position errors.

Embodiment 8

The evaluation value $g_i$ showing calculation position accuracy explained in Embodiment 5 may be output and presented to other wireless terminals via wireless or wired interfaces as an index of accuracy of position information 702. (not shown)

By presenting the index of accuracy of position information 702 along with position information 702, the system utilizing the position information 702 obtained form the present wireless positioning system becomes possible to use the position information 702 added with calculation position accuracy.

The evaluation value $g_i$ showing accuracy may be displayed on the screen (not shown) operated by workers along with position information 702. Specifically, it is conceivable that display means such as a liquid crystal display and a light emitting diode is provided on the positioning management terminal 100, for example, and an accuracy index value is displayed thereon.

Embodiment 9

As explained in Embodiment 3, when the mobile wireless terminal 300 exists in the wireless positioning system, the mobile wireless terminal 300 may be actually fixedly installed in the wireless positioning system instead of being mobile.

The fixed wireless terminal 200 additionally installed to the wireless positioning system may be handled as the mobile wireless terminal 300.

Even the wireless terminal 200 is additionally installed, by calculating position as the mobile wireless terminal 300, the added wireless terminal 200 searches the adjacent terminal and selects the position standard terminal having higher position calculation accuracy to perform range-finding only with the position standard terminal.

Therefore, the position of the added wireless terminal 200 can be automatically obtained and communication amount for range-finding can be reduced.

In Embodiment 3, the mobile wireless terminal 300 and the wireless terminal 200 are configured as the different terminal, however, they may be treated as the same wireless terminal 200.

In this case, a sign that discriminates whether the wireless terminal 200 is the mobile wireless terminal 300 or not is stored in the terminal information storage section 150 of the positioning management terminal 100. The positioning procedure management section 120 positions each wireless terminal 200 and mobile wireless terminal 300 according to the sign.

The sign for the above discrimination may be switched during the system operation.

For example, positioning may be performed under a initially installed condition that all the terminals are the wireless terminal 200. Thereafter part of the wireless terminal 200 is switched for the mobile wireless terminal 300, and positioning may be performed for the relevant mobile wireless terminal 300 as needed according to the method explained in Embodiment 3.

Thus, a positioning method becomes possible in which positioning is performed including, for example, the fixed and immobile wireless terminal 200 and the mobile wireless terminal 300 that does not move at the time of positioning of each wireless terminal 200 and moves thereafter, and then only the mobile wireless terminal 300 is positioned in repetition.

Positioning of much more wireless terminals 200 increases candidates of the available positioning standard terminal, therefore, high precision positioning can be performed using more accurate positioning standard terminal and by correcting by the distance of the positioning standard terminal of higher position calculation accuracy after the positioning.

In the case where after each wireless terminal 200 is once installed, installation position of only part of the wireless terminal 200 is moved, the position can be re-measured with smaller communication amount by temporarily handling the wireless terminal 200 as the mobile wireless terminal 300.

Embodiment 10

In Embodiments 1 to 9 the above, the number of the positioning standard terminal selected by the positioning object decision section 130 is made to be (N+1), however, it is possible to select more than (N+1) positioning standard terminals to calculate the position of the terminal to be positioned from the distance from more than (N+1) positioning standard terminals.

Position calculation by distance information 705 from much more positioning standard terminals improves the positioning accuracy of the terminal to be positioned.

The evaluation value $g_i$ showing the above-mentioned position calculation accuracy may be utilized to select an appropriate number of the positioning standard terminals among more than (N+1) positioning standard terminals.

For example, the wireless terminal 200 whose evaluation value $g_i$ is smaller than a predetermined threshold value may be selected as the positioning standard terminal.

Thus, such a selection of the positioning standard terminal enables selection of a number of wireless terminals 200 having high position calculation accuracy alone as the positioning standard terminal, resulting in improvement of positioning accuracy of the terminal to be positioned.

Embodiment 11

In Embodiment 11 of the present invention, descriptions will be given to an operation example where the number of the adjacent terminals whose position known is poor and the number of positioning standard terminals is scarce. The configuration of the wireless positioning system and each terminal is the same as Embodiments 1 to 10.

The positioning object decision section 130 reduces the dimension to select N positioning standard terminals when the number of the adjacent terminals is less than (N+1) for all the position-undefined wireless terminals 200 and mobile wireless terminals 300.

The positioning procedure management section 120 performs range-finding of the positioning standard terminal and the terminal to be positioned to calculate the position of the terminal to be positioned in the (N−1)-th dimension space determined by the positions of the N positioning standard terminals selected by the positioning object decision section 130.

The calculation is allowable by reducing the dimension from (N−1). The position may be calculated using restriction information such that the terminal is installed on the floor face or the ceiling face, for example.

Thus, in the case where the number of the adjacent terminals is less than (N+1), the position of the wireless terminals 200 and the mobile wireless terminals 300 can be defined in the part where the wireless terminals 200 are sparsely arranged by calculating the position with a reduced dimension.

Embodiment 12

In the above-mentioned Embodiments 1 to 11, the position is adapted to be calculated by distance information of the position-known wireless terminal 200. However, besides the distance, by measuring the time difference of arrival of the radio waves transmitted from the terminal to be positioned at each positioning standard terminal, it is possible to calculate the position of the terminal to be positioned as an intersection point of the hyperbolic line with the position of each positioning standard terminal and measured radio wave propagation time difference being parameters.

Evidently, the same effect can be obtained by deciding the positioning standard terminal and the terminal to be positioned by the present invention in succession regardless of a positioning method to calculate the position of the terminal to be positioned.

Embodiment 13

In the above-mentioned Embodiments 1 to 12, the positioning management terminal 100 may include the distance measurement section 220 and the range-finding data processing section 230, and the above-mentioned positioning procedure may be followed with the positioning management terminal 100 itself being subjected to positioning.

Similarly, the positioning management terminal 100 may further include the adjacent terminal search section 240 and the adjacent terminal data processing section 250 and to perform positioning as the wireless terminal 200 or the mobile wireless terminal 300 explained in Embodiments 2 and 3.

Thereby, automated position calculation becomes possible including the positioning management terminal 100.

Embodiment 14

In the above-mentioned Embodiments 1 to 13, distance measurement section 220 calculates the distance between the wireless terminals 200 based on the radio wave propagation delay time, however, other distance measurement methods such as radio wave reception strength may be utilized.

Embodiment 15

Figure 20:
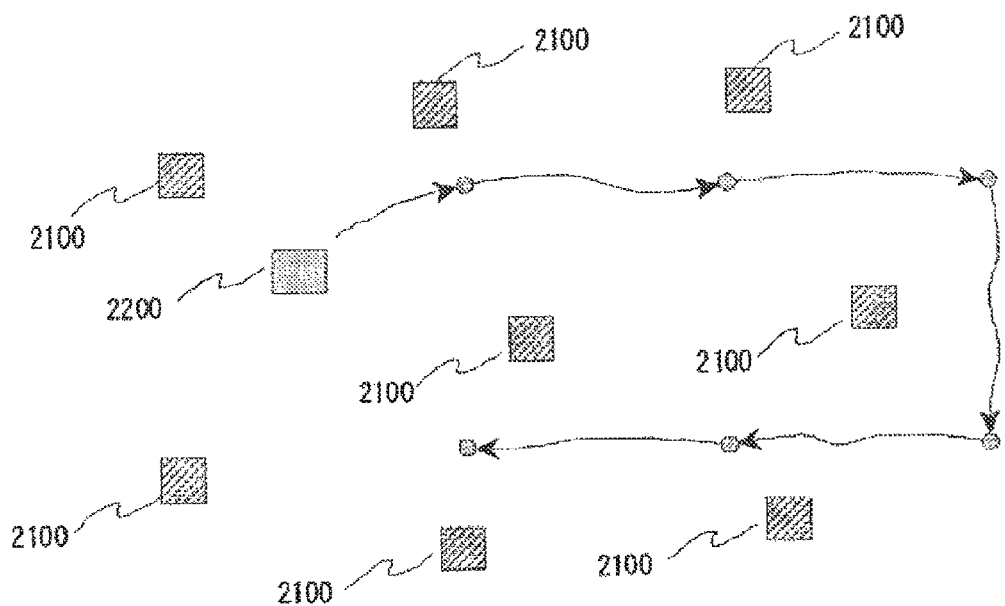
FIG. 20 is a configuration diagram of an environment measurement system of Embodiment 15.

FIG. 20 is a configuration diagram of an environment measurement system of Embodiment 15.

The environment measurement system according to Embodiment 15 is a system that measures environmental conditions of a measurement object space, including a fixed sensor terminal 2100 and a mobile sensor terminal 2200.

The fixed sensor terminals 2100 as fixedly installed in the measurement object space in plural to measure environmental conditions neighboring the self-terminal.

The mobile sensor terminal 2200 measures environmental conditions neighboring the self-terminal while moving in the measurement object space. Measurement points whose environmental conditions the mobile sensor terminal 2200 measures are supposed to be preconfigured.

Figure 21:
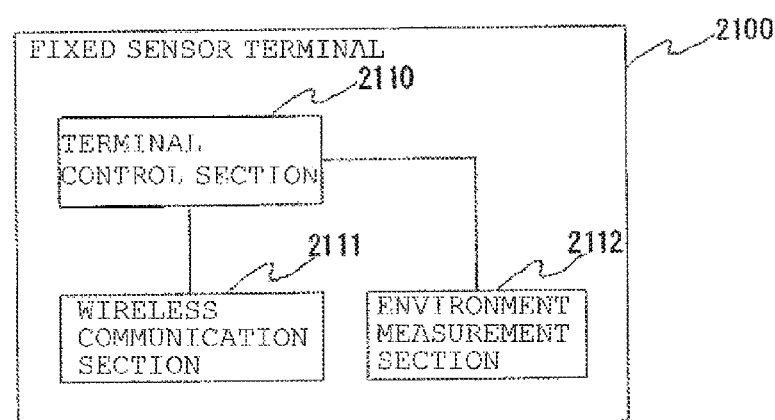
FIG. 21 is a functional block diagram of a fixed sensor terminal 101.

FIG. 21 is a functional block diagram of a fixed sensor terminal 101.

The fixed sensor terminal 2100 includes a terminal control section 2110, a wireless communication section 2111, and an environment measurement section 2112.

The terminal control section 2110 obtains measurement values of environmental conditions measured by the environment measurement section 2112 and exchanges data with other sensor terminals via the wireless communication section 2111.

The wireless communication section 2111 performs wireless communication with other sensor terminals.

The environment measurement section 2112 includes one or a plurality of sensors such as a temperature sensor, a humidity sensor, and an illuminance sensor to measure environmental conditions neighboring the self-terminal such as temperature, humidity, and illuminance.

Kinds of sensors are not limited to the temperature sensor, the humidity sensor, and the illuminance sensor but an arbitrary sensor can be used according to the environment conditions in need of measurement. For example, a sensor may be used that detects a particular chemical substance.

Figure 22:
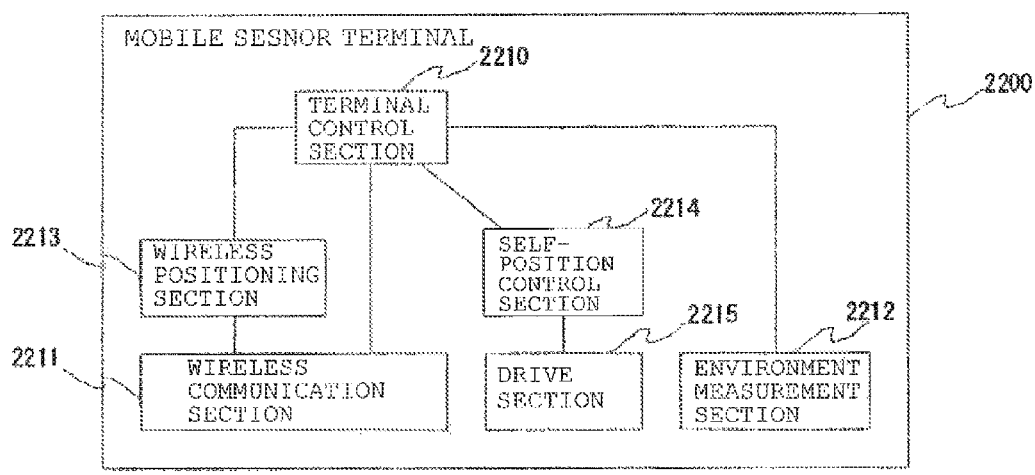
FIG. 22 is a functional block diagram of a mobile sensor terminal 2200.

FIG. 22 is a functional block diagram of a mobile sensor terminal 2200.

The mobile sensor terminal 2200 includes a terminal control section 2210, a wireless communication section 2211, an environment measurement section 2212, a wireless positioning section 2213, a self position control section 2214, and a drive section 2215.

The terminal control section 2210 obtains measurement values measured by the environment measurement section 2212, and exchanges data with other sensor terminals through the wireless communication section 2211.

The terminal control section 2210 has a role to control the position of the self-terminal, in addition. For example, the terminal control section 2210 makes the mobile sensor terminal 2200 move to a desired position by the function of the self position control section 2214, or detects to manage the position of the mobile sensor terminal 2200 by the function of the wireless positioning section 2213.

The wireless communication section 2211 performs wireless communication with other sensor terminals.

The configuration and functions of the environment measurement section 2212 are the same as those of the environment measurement section 2112.

The wireless positioning section 2113 detects the position of the mobile sensor terminal 2200 using wireless communication. Method of detection will be mentioned later.

The self position control section 2214 controls the position of the mobile sensor terminal 2200 to be a desired position by properly operating the drive section 2215 from a target position and the current position of the mobile sensor terminal 2200.

As for a method of controlling the sensor terminal to be the desired position, such a method is conceivable that to calculate a deviation between the target position and the current position of the mobile sensor terminal 2200 to change operation time of the drive section 2215 based on the deviation, and to give an output command in proportion to the deviation to the drive section 2215.

The drive section 2215 is means to move the mobile sensor terminal 2200. The drive section 2215 includes a motor and wheels, for example, being capable of moving the mobile sensor terminal 2200 by rotating wheels. The drive section 2215 may be configured so that a walk form by a caterpillar and link mechanism move the mobile sensor terminal 2200 as well.

The terminal control section 2110, the terminal control section 2210, the wireless positioning section 2213, and the self position control section 2214 may be configured using hardware such as a circuit device that achieves these functions or may be configured using operation devices such as a microprocessor and a CPU (Central Processing Unit) and software specifying their operations.

The wireless communication section 2111 and the wireless communication section 2211 appropriately include a necessary configuration such as a wireless communication interface.

In the above, the configuration of the environment measurement system according to Embodiment 15 is explained.

Next, descriptions will be given to a position detection method by the wireless positioning section 2213.

Figure 23:
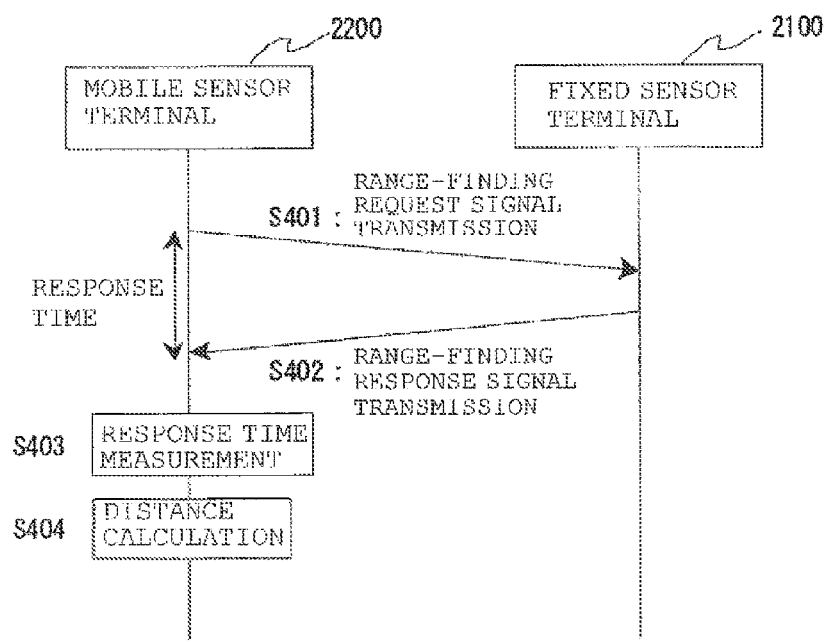
FIG. 23 is a diagram illustrating procedure for a wireless positioning section 2213 to calculate the distance between the mobile sensor terminal 2200 and a fixed sensor terminal 2100.

FIG. 23 is a diagram illustrating procedure for a wireless positioning section 2213 to calculate the distance between the mobile sensor terminal 2200 and a fixed sensor terminal 2100. Each step of FIG. 23 will be explained as follows.

(S401)

The mobile sensor terminal 2200 transmits a range-finding request signal via the wireless communication section 2211.

(S402)

Upon receiving the range-finding request signal, the fixed sensor terminal 2100 transmits a range-finding response signal to the mobile sensor terminal 2200.

(S403)

The mobile sensor terminal 2200 receives the range-finding response signal via the wireless communication section 2211. The wireless positioning section 2213 measures the response time from the transmission of the range-finding request signal to the reception of the range-finding response signal.

The wireless positioning section 2213 can measure the response time by such a method as to start time measurement by a counter at the time of transmitting the range-finding request signal and to read a time measurement value by the counter at the time of receiving the range-finding response.

(S404)

The wireless positioning section 2213 of the mobile sensor terminal 2200 calculates the distance between the mobile sensor terminal 2200 and the fixed sensor terminal 2100 by multiplying the response time measured in step S403 by the velocity of the electromagnetic wave and by referring to a correspondence table between a predetermined response time and the distance.

Figure 24:
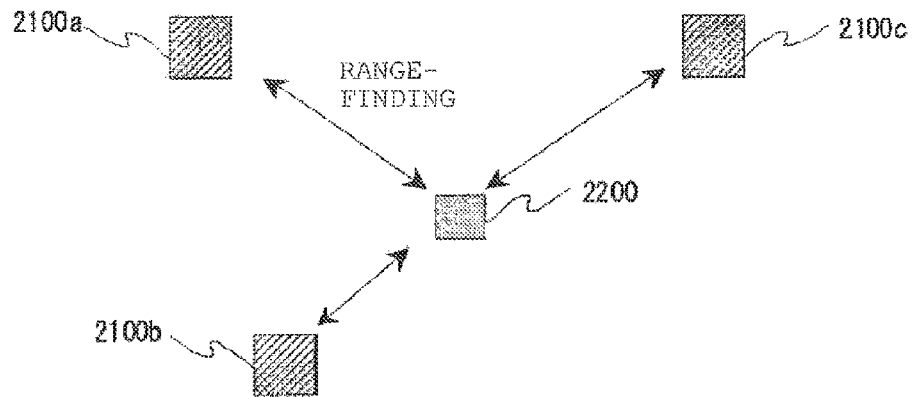
FIG. 24 is a diagram illustrating a method for the wireless positioning section 2213 to calculate the position of the mobile sensor terminal 2200.

FIG. 24 is a diagram illustrating a method for the wireless positioning section 2213 to calculate the position of the mobile sensor terminal 2200.

The wireless positioning section 2213 performs procedure to calculate the distance between the mobile sensor terminal 2200 and the fixed sensor terminal 2100 for a plurality of fixed sensor terminals 2100 (for example, 100*a* to 100*c* in FIG. 24).

Next, the wireless positioning section 2213 obtains a circle whose center is the fixed sensor terminal 2100 and whose radius is calculated distance between terminals from the inter-terminal distances between a plurality of fixed sensor terminals 2100 and the mobile sensor terminal 2200 and positions of each fixed sensor terminals 2100 (assumed to be known).

The wireless positioning section 2213 can detect the area where these circles intersect as the position of the mobile sensor terminal 2200.

Therefore, in order to detect the position of the mobile sensor terminal 2200 with high precision, it is preferable to calculate the inter-terminal distance among three or more fixed sensor terminals 2100.

In the above, a method of detecting the position, of the mobile sensor terminal 2200 is explained.

Next, descriptions will be given to operation of the mobile sensor terminal 2200 to measure environmental conditions.

Figure 25:
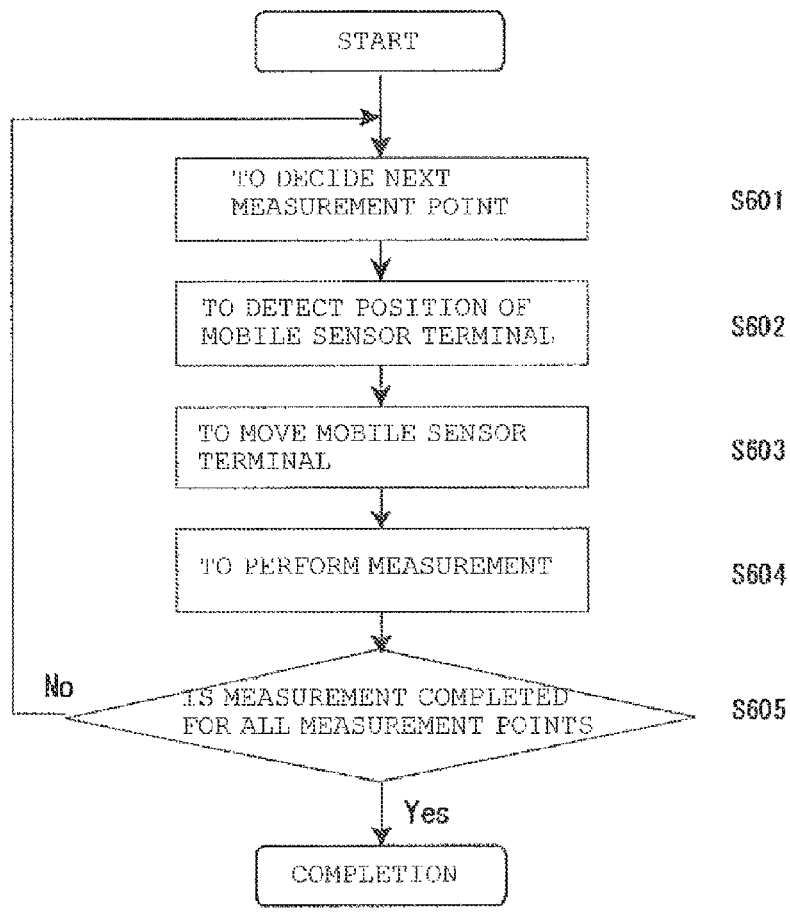
FIG. 25 is an operation flow for the mobile sensor terminal 2200 to measure environmental conditions.

FIG. 25 is an operation flow when the mobile sensor terminal 2200 measures environmental conditions.

Each step of FIG. 25 will be explained as follows.

(S601)

The terminal control section 2210 decides a measurement point where the environmental conditions are measured next in the preset measurement point list. The terminal control section 2210 may select the measurement point according to a preset order, or select the nearest measurement point from the current position of the mobile sensor terminal 2200. The next measurement point may be selected by other methods.

(S602)

The wireless positioning section 2213 detects the position of the mobile sensor terminal 2200 by the methods explained in FIGS. 23 and 24.

(S603)

The self position control section 2214 performs control operation to move the mobile sensor terminal 2200 to a specified measurement point with the measurement point decided in step S601 being a target position and with the position detected in step S602 being the current position.

The self position control section 2214 decides operation time of the drive section 2215 from the deviation between the target position and the current position, for example, to move the mobile sensor terminal 2200 to the measurement point by making the drive section 2215 operate for the operation time.

Alternatively, the self position control section 2214 may move the mobile sensor terminal 2200 to the measurement point by detecting and moving the current position by the wireless positioning section 2213 in repetition until the deviation between the position of the measurement point and the current point becomes a predetermined threshold or less.

As for the method of controlling the position of the mobile sensor terminal 2200, a method of controlling a general self-propelled robot may be applied.

(S604)

When the mobile sensor terminal 2200 moves to the measurement point, the environment measurement section 2212 measures environmental conditions neighboring the self-terminal.

(S605)

The terminal control section 2210 judges whether measurement of environmental conditions is completed or not for all measurement points included in the measurement point list. When there is an uncompleted measurement point, return to step S601 to repeat the same processing. After the completion of the measurement in all the measurement points included in the measurement point list, the measurement of environmental conditions is completed.

In the above, an operation of measuring environmental conditions of the mobile sensor terminal 2200 is explained.

The fixed sensor terminal 2100 may measure environmental conditions neighboring the self-terminal in synchronization with the mobile sensor terminal 2200, or measure environmental conditions independent of the mobile sensor terminal 2200.

As mentioned above, according to Embodiment 15, since small number of the fixed sensor terminals 2100 and mobile sensor terminals 2200 are adapted to measure environmental conditions of the measurement object space, it is possible to measure environmental conditions at many measurement points without increasing sensors to be fixedly installed.

According to Embodiment 15, the wireless positioning section 2213 detects the current position of the mobile sensor terminal 2200 utilizing the wireless communication signal between the fixed sensor terminal 2100 and the mobile sensor terminal 2200. The mobile sensor terminal 2200 measures environmental conditions utilizing the detection results to understand the position of the self-terminal.

Thereby, with no need of installing other devices to be a reference of the current position of the mobile sensor terminal 2200 such as a guide rail and a marker, an environment measurement system can be introduced with less cost with ease.

In general, the position after a self-propelled robot moved has an error against a target position.

In Embodiment 15, since the position of the mobile sensor terminal 2200 is detected by wireless, an actually measured point can be correctly grasped by holding both the measured environment conditions and the detection point of the mobile sensor terminal 2200 even when errors exist from the measurement point.

That is, measurement of environment conditions at a position other than a predetermined measurement point results in a correct measurement of environment conditions of the measurement object area because the correspondence relation itself is not erroneous between the position and the environment conditions.

By performing feedback of the detected position to make it move to the measurement point, the mobile sensor terminal 2200 can be correctly moved to the measurement point.

Embodiment 16

Figure 26:
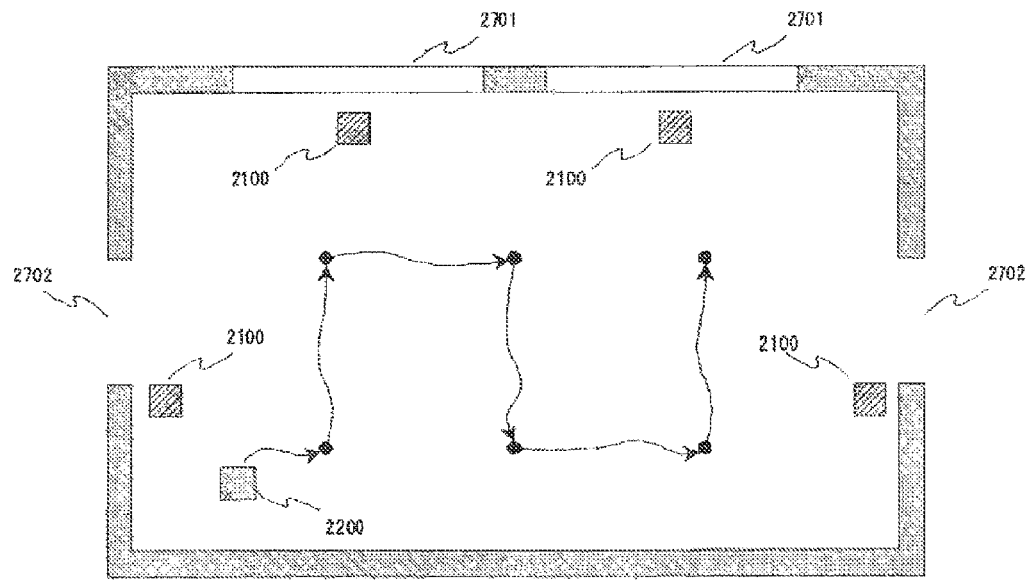
FIG. 26 is a configuration diagram of an environment measurement system of Embodiment 16.

FIG. 26 is a configuration diagram of an environment measurement system of Embodiment 16.

In Embodiment 16, the fixed sensor terminal 2100 is installed at a position where measurement of environmental conditions is required for a larger time period than other measurement points. The mobile sensor terminal 2200 measures environmental conditions at the measurement position where no larger time period is required other than that.

For example, in an environment measurement system that measures the temperature inside a building, heat movement near a window 2701 and a gateway 2702 is large, requiring measurement of environmental conditions with a large time period. To the contrary, in the floor portion other than that, no measurement with a large time period is required.

Accordingly, as shown in FIG. 26, the fixed sensor terminal 2100 is installed at a position neighboring the window 2701 or near the gateway 2702 where a large time period is required. The mobile sensor terminal 2200 measures environmental conditions while moving at measurement points besides those.

Even when the fixed sensor terminal 2100 and the mobile sensor terminal 2200 measure environmental conditions in synchronization, while the fixed sensor terminal 2100 continuously measures environmental conditions of the same place, the mobile sensor terminal 2200 measures environmental conditions of a plurality of measurement points while moving.

As a result, the fixed sensor terminal 2100 more frequently performs measurement of the same measurement point.

As mentioned above, in Embodiment 16, the fixed sensor terminal 2100 is installed at a position where measurement is required for a larger time period than other measurement points. The mobile sensor terminal 2200 measures environmental conditions at a position where no larger time period is required.

Thus, the fixed sensor terminal needs not to be installed at all positions, enabling an effective measurement of environmental conditions with fewer number of terminals. Further, a flexible system can be configured according to demands of the system.

Embodiment 17

Figure 27:
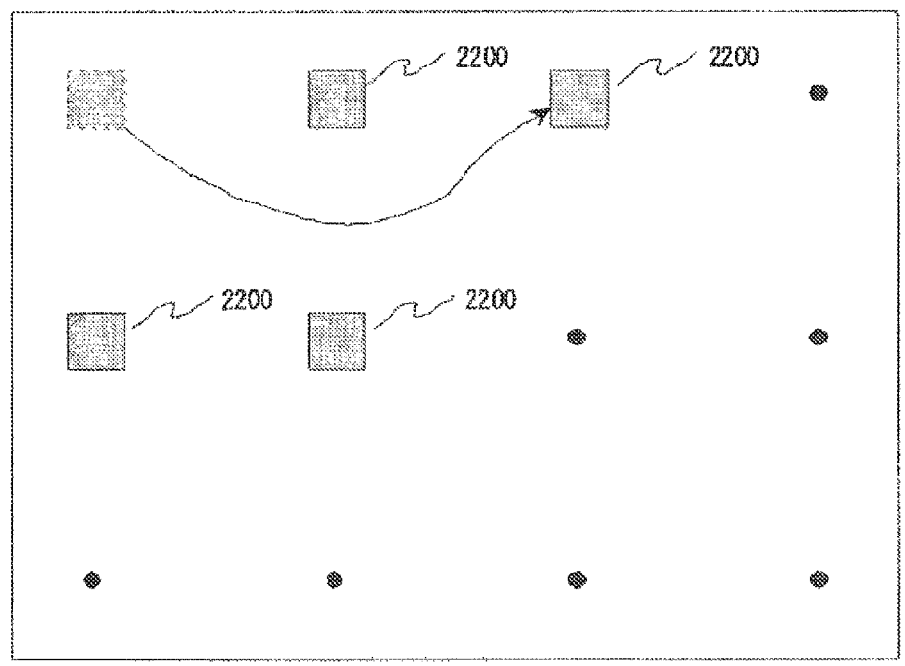
FIG. 27 is a configuration diagram of an environment measurement system of Embodiment 17.

FIG. 27 is a configuration diagram of an environment measurement system of Embodiment 17.

The environmental measurement system according to Embodiment 17 includes four or more mobile sensor terminals 2200. The configuration of the mobile sensor terminal 2200 is the same as Embodiments 15 and 16.

Figure 28:
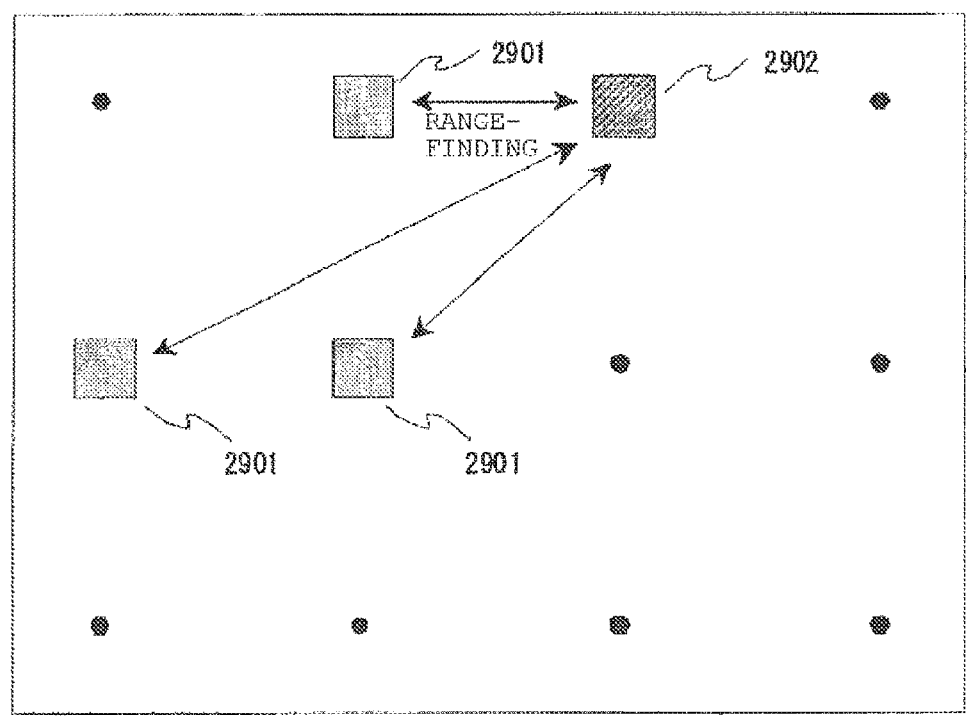
FIG. 28 is a diagram illustrating the state in which the mobile sensor terminal 2200 switches a role of the self terminal.

FIG. 28 is a diagram illustrating a state in which the mobile sensor terminal 2200 switches a role of a self terminal.

In Embodiment 17, the mobile sensor terminals 2200 detect the position each other to measure environmental conditions while switching two roles: a role to be an object for moving and position detection to move to the measurement point and the role to designate a standard position for position detection without moving.

Hereinafter, the mobile sensor terminal 2200 to play the former role is referred to as a position detection object terminal 2902, and the mobile sensor terminal 2200 to play the latter role is referred to as a position detection standard terminal 2901. The measurement point list for measuring environmental conditions and the initial position of each mobile sensor terminal 2200 is assumed to be set in advance.

Figure 29:
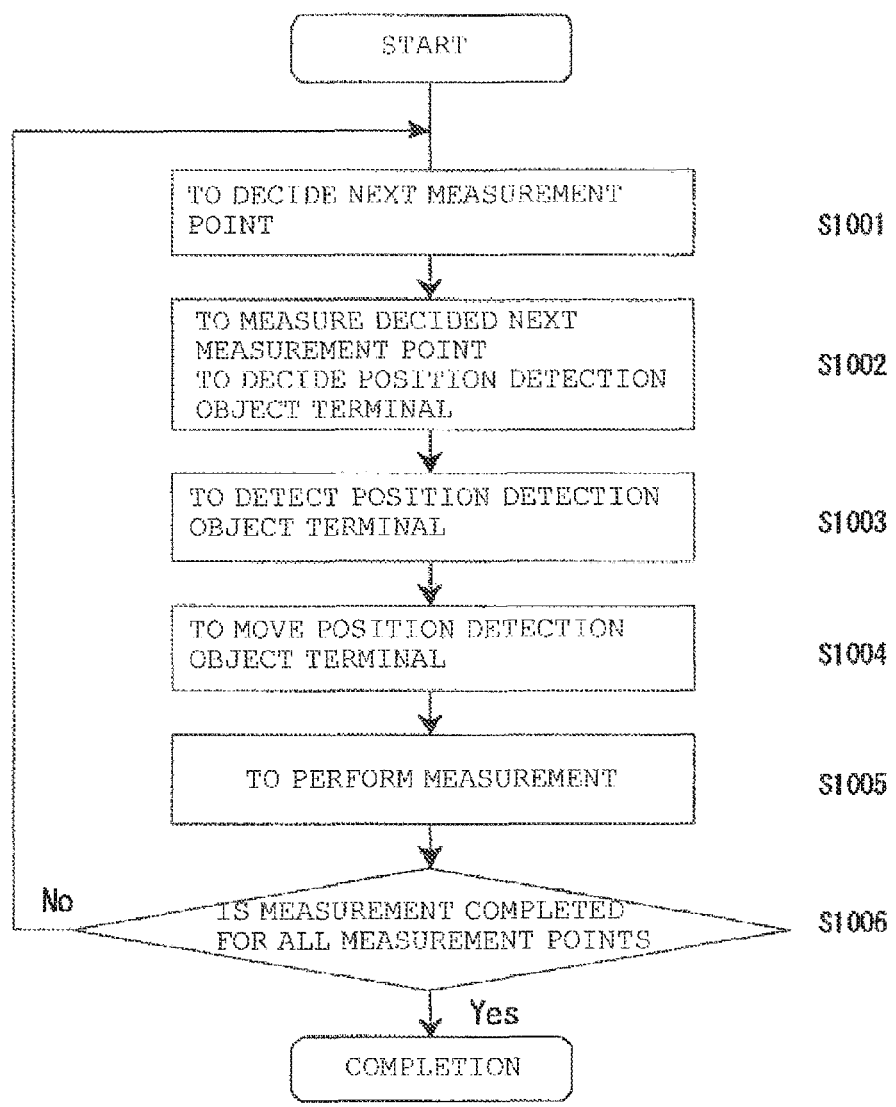
FIG. 29 is an operation flow for a position detection object terminal 2902 to measure environmental conditions.

FIG. 29 is an operation flow for the position detection object terminal 2902 to measure environmental conditions.

Descriptions will be given to each step in FIG. 29.

(S1001)

The present step is the same as the step S601 in FIG. 25.

(S1002)

The terminal control section 2210 decides the position detection object terminal 2902 and position detection standard terminal 2901 other than the same among each mobile sensor terminal 2200 based on the position of the measurement point decided in step S1001. Hereinafter the position detection object terminal 2902 measures environmental conditions of the measurement point decided in step S1001.

The terminal control section 2210 makes the farthest mobile sensor terminal 2200 from the measurement point decided in step S1001 the position detection object terminal 2902, for example, and makes other mobile sensor terminals 2902 the position detection standard terminals 2901.

(S1003)

The wireless positioning section 2213 detects the position of the position detection object terminal 2902. Position detection can be performed by transmitting and receiving a range-finding signal between the position detection object terminal 2902 and the position detection standard terminal 2901 like the position detection by the wireless positioning section 2213 in Embodiments 15 and 16.

(S1004)

The position detection object terminal 2902 moves to the measurement point that the self position control section 2214 designates according to the same procedure as step S603 in FIG. 25.

(S1005)

The same as step S604 in FIG. 25.

(S1006)

The same as step S605 in FIG. 25.

As mentioned above, the environment measurement system according to Embodiment 17 includes four or more mobile sensor terminals 2200. The mobile sensor terminals 2200 measure environmental conditions of the measurement object space by detecting the position each other to move while switching two roles of the position detection object terminal 2902 and the position detection standard terminal 2901.

Thereby, with fewer terminals, environmental conditions at a number of measurement points can be measured.

According to the environment measurement system according to Embodiment 17, only by setting the initial mobile sensor terminal 2200, environmental conditions of the building and the factory can be measured including position information. Thus, setting work for starting environmental measurement can be drastically reduced.

The environment measurement system according to Embodiment 17 is constituted only by the more mobile sensor terminals 2200. However, the position of the position detection object terminal 2902 may be detected by making a configuration including one or two fixed sensor terminals 2100 to transmit and receive a range-finding signal between the position detection object terminal 2902 and the fixed sensor terminal 2100.

Thereby, position detection precision of the position detection object terminal 2902 can be improved.

It is explained that in Embodiment 17, there are four or more mobile sensor terminals 2200. However, if coarse precision is allowable for position detection of the mobile sensor terminal 2200, the same method can be used as that explained in Embodiment 17 even when the mobile sensor terminal 2200 is three or less.

Embodiment 18

In Embodiment 18, an example will be explained in which a decision method of the measurement point is changed in step S1001 of Embodiment 17. In Embodiment 18, such operations are performed as follows in step S1001.

(S1001)

The terminal control section 2210 calculates a distance between a position of the measurement point where measurement of environmental conditions has not been completed among the preset measurement point list and a current position of each mobile sensor terminal 2200.

Next, the terminal control section 2210 makes a measurement point in which at least three or more distances out of calculated distances are smaller than a predetermined value to be the following measurement point. The predetermined value is a communicable distance of the wireless communication section 2211, for example.

A decision of the next measurement point can prevent such an event that the position detection object terminal 2902 moves beyond a communicable distance with the position detection standard terminal 2901 to cause a failure in position detection.

When there is a plurality of measurement points that satisfies the above condition, a gravity center position of the current position of each mobile sensor terminal 2200 is calculated. Then, the next measurement point may be decided as the nearest measurement point to the gravity center point among a plurality of measurement points that satisfies the above condition.

Thereby, environmental conditions can be measured from the point near the mobile sensor terminal 2200, making it possible to reduce the time for measuring a moving distance and environmental conditions.

Embodiment 19

In Embodiment 19, an example will be explained in which a method of deciding the position detection object terminal 2902 and the position detection standard terminal 2901 is changed in step S1002 of Embodiment 17. In Embodiment 19, such operations are performed as follows in step S1002.

(S1002: 1)

The terminal control section 2210 calculates a distance between a position of the measurement point where measurement of environmental conditions has not been completed among the preset measurement point list and a current position of each mobile sensor terminal 2200.

Next, the terminal control section 2210 selects three or more mobile sensor terminals 2200 whose calculated distance is smaller than a predetermined value to make these the position detection standard terminal 2901. Other mobile sensor terminals 2200 are made to be position detection object terminals 2902.

(S1002: 2)

When there is a plurality of candidates of combination of the position detection standard terminals 2901, the terminal control section 2210 may make a combination having a high position detection precision in a geometric relation with each measurement point to be the position detection standard terminal 2901, and other mobile sensor terminals 2200 to be the position detection object terminals 2902.

For an evaluation index of selecting a combination having high position detection precision, GIDOP (Geometric Dilution of Precision) can be utilized that is used in the field of GPS (Global Positioning System).

Thereby, position detection precision of the position detection object terminal 2902 improves, achieving reduction in position errors regarding the measurement point where environmental conditions are measured.

An evaluation function may be defined by combining a method of deciding the measurement point described in Embodiment 18 and the method of deciding the position detection object terminal 2902 and the position detection standard terminal 2901 in Embodiment 19.

The terminal control section 2210 selects a measurement point having the highest evaluation value of the evaluation function, the position detection object terminal 2902, and the position detection standard terminal 2901.

In this case, it is possible to integrally evaluate the position of the measurement point and the combination of the position detection object terminal 2902 and the position detection standard terminal 2901 to improve the position detection precision, as well.

Embodiment 20

In Embodiments 15 to 19 in the above, a measurement point list for measuring environmental conditions is assumed to be preset. In Embodiment 20, an operation example will be explained in which the measurement point list is automatically generated.

Embodiment 20 is constituted by the fixed sensor terminal 2100 and the mobile sensor terminal 2200 like Embodiments 15 to 19. Configuration of each terminal is the same as that of Embodiments 15 to 19.

Figure 30:
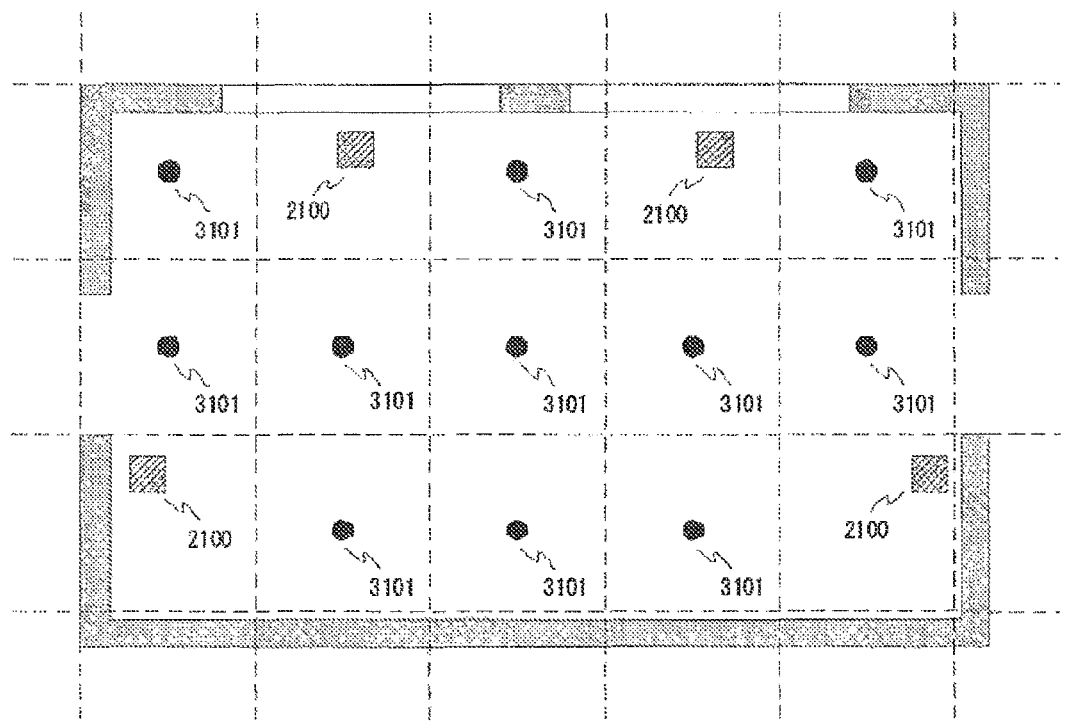
FIG. 30 is a diagram showing the state in which a measurement object space is divided.

FIG. 30 is a diagram showing the state in which a measurement object space is divided.

In Embodiment 20, the measurement object space is divided into a lattice shape of a predetermined interval. The measurement point list is constituted by typical points 3101 of the area (cell) sectioned by each lattice. The typical point 3101 is the center of each cell for example.

By making the typical point 3101 of each cell to be the measurement point, there is no need to configure the measurement point list separately, making the preset work for starting measurement of environmental conditions to be simpler.

Among cells partitioned in a lattice shape, the typical point 3101 of the cell excluding the cell where the fixed sensor terminal 2100 is installed may be the measurement point. Thereby, an overlapping of the measurement point can be prevented, enabling an efficient measurement of environmental conditions.

In the step for deciding the next measurement point (step S601 or S1001) in Embodiments 15 to 19, a predetermined interval between measurement points may be defined instead of selecting the next measurement point from a preset measurement point list.

In that case, the terminal control section 2210 calculates the position that is displaced by a predetermined interval from the measurement point measured in the previous step.

Thus, the same effect as Embodiment 20 is exhibited by sequentially calculating the next measurement point instead of presetting the measurement point list.

In the step (S601 or S1001) for deciding the next measurement point in Embodiments 15 to 19, the next measurement point may be defined by deciding a random movement direction and movement amount by pseudorandom numbers generation and the like to follow the movement direction and movement amount.

In this case, by a random measurement while detecting the position of the mobile sensor terminal 2200 by mobile communication, it is possible to autonomously minutely measure the entire measurement object space in place of pre-configuring the measurement point list.

Embodiment 21

In Embodiment 21, a configuration example of the mobile sensor terminal 2200 will be explained. Other configurations are the same as Embodiments 15 to 20.

Figure 31:
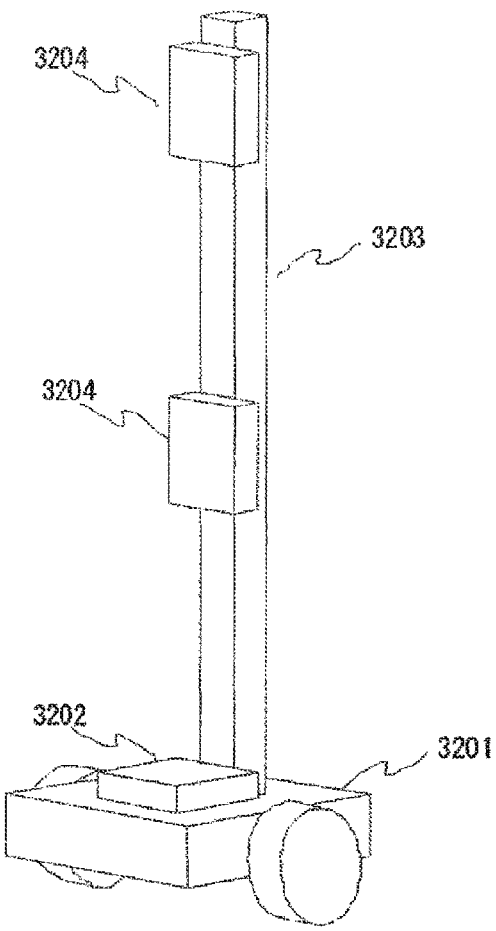
FIG. 31 is a configuration diagram of the mobile sensor terminal 2200 of Embodiment 21.

FIG. 31 is a configuration diagram of the mobile sensor terminal 2200 of Embodiment 21.

The mobile sensor terminal 2200 according to Embodiment 21 includes a mobile cart 3201, a control module 3202, a support table 3203, and a sensor module 3204.

The mobile cart 3201 includes means for moving on a two-dimension plane, for example, a wheel.

The terminal, control section 2210 and the wireless communication section 2211 are built-in in the control module 3202.

The support table 3203 is a bar-shaped pedestal vertically installed to the mobile cart 3201.

The sensor module 3204 accommodates the environment measurement section 2212 and one or a plurality of the same is installed along the support table 3203.

By configuring the mobile sensor terminal 2200 like the above, it becomes possible to measure environmental conditions in the height direction simultaneously, allowing more detailed measurement of environmental conditions.

In the same way, as for the fixed sensor terminal 2100, a bar-shaped support table may be provided and a plurality of sensor modules may be installed on the support table. Thereby, more detailed measurement of environmental conditions becomes possible for the installation location of the fixed sensor terminal 2100.

Embodiment 22

Figure 32:
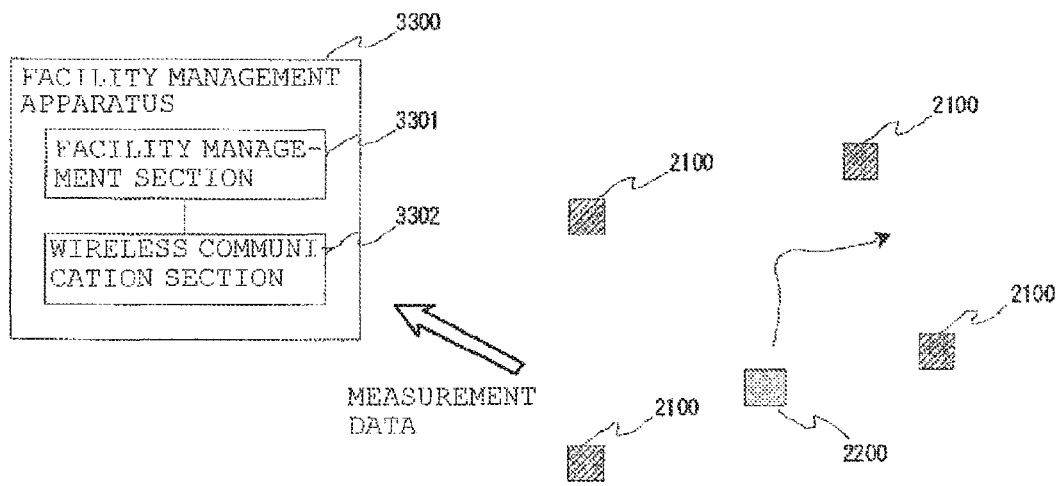
FIG. 32 is a configuration diagram of a facility management system of Embodiment 22.

FIG. 32 is a configuration diagram of a facility management system of Embodiment 22.

The facility management system according to Embodiment 22 includes a facility management apparatus 3300 in addition to the environment measurement system according to Embodiments 15 to 21.

The facility management apparatus 3300 includes a facility management section 3301 and a wireless communication section 3302.

In Embodiment 22, the facility management apparatus 3300 obtains measurement data measured by the environment measurement system through the wireless communication section 3302. The facility management section 3301 controls facility equipment such as air-conditioning and lighting based on the measurement data.

As mentioned above, according to Embodiment 22, fewer sensor terminals measure a lot of environmental conditions, allowing control of facility equipment based on measurement results.

Thereby, facility equipment can be controlled more minutely such that temperature and lighting are adjusted to suite personal tastes and facility equipment is controlled with high energy-saving effect according to a fine temperature distribution in the space.

Embodiment 23

In the above Embodiments 15 to 22, the fixed sensor terminal 2100 and the mobile sensor terminal 2200 can use an ultra wideband impulse wireless signal that transmits an impulse signal at the time of transmitting the range-finding request signal and the range-finding response signal.

Thereby, the response time can be accurately measured, allowing to detect an inter-terminal distance and a terminal position more accurately.

In the above Embodiments 15 to 22, the inter-terminal distance and the terminal position may be calculated based on a received radio wave intensity of the wireless communication between the mobile sensor terminal 2200 and the fixed sensor terminal 2100.

Alternatively, in the above Embodiments 15 to 22, the inter-terminal distance and the terminal position may be detected utilizing a time difference of reception of the transmitted range-finding request signal from the mobile sensor terminal 2200 by each of a plurality of the fixed sensor terminals 2100, that is, a radio wave transmission time difference.

In the above Embodiments 15 to 22, the position of the fixed sensor terminals 2100 is supposed to be preconfigured, however, the relative position of the fixed sensor terminals 2100 may be calculated. For example, procedures as follows may be used.

Firstly, the distance between the fixed sensor terminals 2100 is calculated based on wireless communication with the same method as the above. The position of the fixed sensor terminals 2100 is detected by obtaining the relative position between the fixed sensor terminals 2100. Based on the position, the position of the mobile sensor terminal 2200 can be detected.

In the above Embodiments 15 to 22, the position of the mobile sensor terminal 2200 can be detected by installing a plurality of the mobile sensor terminals 2200 to utilize the range-finding signal between each mobile sensor terminal 2200 and the fixed sensor terminals 2100 as well.

Embodiment 24

In the above Embodiments 15 to 23, it is configured that the wireless positioning section 2213 is included in the mobile sensor terminal 2200 to detect the position thereof, however, the present invention is not limited to the above configuration.

For example, in place of the mobile sensor terminal 2200, any of the fixed sensor terminals 2100 can include the wireless positioning section 2213.

In this case, information such as a received radio wave intensity, a radio wave propagation time, and a radio wave propagation time difference is transmitted from the mobile sensor terminal 2200 to the fixed sensor terminal 2100. The wireless positioning section 2213 of the fixed sensor terminal 2100 detects the position of the mobile sensor terminal 2200 based on the information.

Alternatively, in the above Embodiments 15 to 23, the fixed sensor terminal 2100 may measure the received radio wave intensity, the radio wave propagation time, and the radio wave propagation time difference by the wireless communication with the mobile sensor terminal 2200.

The fixed sensor terminal 2100 transmits the measurement values to other terminals having the wireless positioning section 2213. The wireless positioning section 2213 of the terminal that received the information detects the position of the mobile sensor terminal 2200.

In the above Embodiments 15 to 23, a central management apparatus (not shown) and the like having a wireless communication section may include the same function apart from the fixed sensor terminal 2100 and the mobile sensor terminal 2200, for example.

In this case, the central management apparatus and the like may be adapted to detect the position of the mobile sensor terminal 2200 or to transmit the measurement point whose environmental conditions to be measured next to the mobile terminal 2200.

The invention claimed is:

1. A wireless terminal positioning system including a plurality of wireless terminals and a positioning management terminal that manages positioning of the plurality of wireless terminals, wherein the positioning management terminal includes:
a positioning object decision section that selects a terminal to be positioned which is a positioning object and a plurality of positioning standard terminals whose positions are known, from among the plurality of wireless terminals;
a positioning management section that requests distances between the terminal to be positioned and the positioning standard terminals;
a position calculation section that calculates a target position of the terminal to be positioned; and
a storage section that keeps a wireless terminal list that includes terminal addresses of the plurality of wireless terminals and positions thereof and an adjacent terminal list of adjacent terminals to which wireless signals from each of the plurality of wireless terminals reach, each of the plurality of wireless terminals includes:
a distance measurement section that measures the distances from adjacent terminals that wireless signals of the wireless terminal reach;
a communication section that transmits measurement results of the distance measurement section to the positioning management terminal, and
an adjacent terminal search section that searches the adjacent terminals that wireless signals reach; and wherein
the positioning management section requests the adjacent terminal list of each of the plurality of wireless terminals,
the adjacent terminal search section searches the adjacent terminals of the relevant wireless terminal based on the request for resultant adjacent terminal list to the positioning management terminal,
the positioning object decision section selects a terminal whose position has not been defined and that has a predetermined number of the adjacent terminals or more whose positions have been defined in the corresponding adjacent terminal list as the terminal to be positioned, the positioning management section requests distances from the positioning standard terminals selected by the positioning object decision section to the terminal to be positioned selected by the positioning object decision section, and
the position calculation section calculates the target position of the terminal to be positioned using the distances and reference positions of the positioning standard terminals.

2. The wireless terminal positioning system of claim 1, wherein
the positioning object decision section repeatedly selects the terminal to be positioned and the positioning standard terminals until the position calculation section calculates positions of all the plurality of wireless terminals, and
the positioning management section requests distances between the terminal to be positioned and the positioning standard terminals for each repetition.

3. The wireless terminal positioning system of claim 1, wherein
when the position calculation section calculates N-dimension coordinates of the terminal to be positioned,
the positioning object decision section selects a wireless terminal having at least N+1 adjacent terminals whose positions are known, as the terminal to be positioned, and
selects the at least N+1 adjacent terminals as the positioning standard terminals.

4. The wireless terminal positioning system of claim 1, wherein
the storage section stores the positions of the plurality of wireless terminals and the distances from each wireless terminal to the adjacent terminals thereof, and
the positioning object decision section calculates a precision index value of the positions based on the positions and the distances.

5. The wireless terminal positioning system of claim 4, wherein
the positioning object decision section calculates a distance between a stored position of each of wireless terminals and a stored position of a corresponding adjacent terminal of the adjacent terminals, and
obtains a measured distance from the wireless terminal to the corresponding adjacent terminal from the storage section to calculate the precision index value of positions based on a difference of the calculated distance and the measured distance.

6. The wireless terminal positioning system of claim 4, wherein
the positioning object decision section selects the terminal to be positioned or the positioning standard terminals thereof so that the precision index value of the positions becomes the highest.

7. The wireless terminal positioning system of claim 1, wherein
the positioning management section requests distances between each of the plurality of wireless terminals and the corresponding adjacent terminals, and
the position calculation section calculates a relative position of the relevant wireless terminal using the distances.

8. The wireless terminal positioning system of claim 1, wherein,
after the position calculation section calculates positions of all the plurality of wireless terminals, the positioning management section requests distances of any one of the plurality of wireless terminals to other wireless terminals, and the position calculation section re-calculates the positions of the plurality of wireless terminals using the requested distances.

9. The wireless terminal positioning system of claim 1, wherein the positioning management terminal includes a second distance positioning section that measures a distance from an adjacent terminal that wireless signals of the relevant positioning management terminal reaches, and the position calculation section calculates a position of the relevant positioning management terminal using the distance measured by the second distance measurement section and position information of the positioning standard terminal.

10. The wireless terminal positioning system of claim 1, wherein the positioning management terminal includes a second adjacent terminal search section that searches adjacent terminals that wireless signals reach, and the second adjacent terminal search section stores the adjacent terminal list obtained by searching to the storage section.

11. The wireless terminal positioning system of claim 1, wherein the distance measurement section measures the distance between the plurality of wireless terminals using a radio wave propagation time of the wireless signals.

12. The wireless terminal positioning system of claim 11, wherein the communication section uses an ultra wideband signal that transmits an impulse signal for the wireless signals in use when the distance measurement section measures the distance between the plurality of wireless terminals.

13. The wireless terminal positioning system of claim 1, wherein the communication section performs multi-hop communication.

* * * * *